(12) United States Patent
Jaster et al.

(10) Patent No.: US 8,494,894 B2
(45) Date of Patent: Jul. 23, 2013

(54) UNIVERSAL CUSTOMER BASED INFORMATION AND ONTOLOGY PLATFORM FOR BUSINESS INFORMATION AND INNOVATION MANAGEMENT

(75) Inventors: Mark Jaster, Rosemont, PA (US); Anthony W. Ulwick, Aspen, CO (US)

(73) Assignee: Strategyn Holdings, LLC, San Francisco, CA (US)

( * ) Notice: Subject to any disclaimer, the term of this patent is extended or adjusted under 35 U.S.C. 154(b) by 490 days.

(21) Appl. No.: 12/563,969

(22) Filed: Sep. 21, 2009

(65) Prior Publication Data

US 2010/0082691 A1   Apr. 1, 2010

Related U.S. Application Data

(60) Provisional application No. 61/098,690, filed on Sep. 19, 2008, provisional application No. 61/209,764, filed on Mar. 10, 2009.

(51) Int. Cl.
G06Q 10/00 (2012.01)
G06Q 40/00 (2012.01)
G06Q 30/02 (2012.01)

(52) U.S. Cl.
USPC ........ 705/7.29; 705/7.31; 705/7.32; 705/7.33

(58) Field of Classification Search
USPC .......................................... 705/1–44; 706/13
See application file for complete search history.

(56) References Cited

U.S. PATENT DOCUMENTS

| | | | |
|---|---|---|---|
| 4,885,685 A | 12/1989 | Wolfberg et al. | |
| 4,894,773 A | 1/1990 | Lagarias | |
| 4,924,386 A | 5/1990 | Freedman et al. | |
| 4,992,940 A | 2/1991 | Dworkin | |
| 4,996,642 A | 2/1991 | Hey | |
| 5,009,626 A | 4/1991 | Katz | |
| 5,041,972 A | 8/1991 | Frost | |
| 5,111,392 A | 5/1992 | Malin | |
| 5,122,952 A | 6/1992 | Minkus | |
| 5,124,911 A | 6/1992 | Sack | |
| 5,164,897 A | 11/1992 | Clark et al. | |
| 5,182,793 A | 1/1993 | Alexander et al. | |
| 5,200,909 A | 4/1993 | Juergens | |
| 5,251,294 A | 10/1993 | Abelow | |

(Continued)

FOREIGN PATENT DOCUMENTS

| EP | 210742 A2 | 2/1987 |
|---|---|---|
| FR | 2752934 A1 | 3/1998 |

OTHER PUBLICATIONS

Co-pending U.S. Appl. No. 13/020,546, filed Feb. 3, 2011.

(Continued)

*Primary Examiner* — Jason B Dunham
*Assistant Examiner* — Zahra Elkassabgi
(74) *Attorney, Agent, or Firm* — Sheppard Mullin Richter & Hampton LLP

(57) ABSTRACT

A system constructed using one or more of the techniques described includes a collective set of data structures, uniquely designed entities, information tools, and computational and machine methods useful to store, append, interact with, retrieve, process, and present data and information in a fashion that enables associations to be made between the entities and the particular Jobs and Outcomes that pertain to the underlying markets, or possible markets, of an enterprise which have been identified by separate analysis following an Outcome Driven Innovation (ODI) methodology.

11 Claims, 25 Drawing Sheets

U.S. PATENT DOCUMENTS

| | | | |
|---|---|---|---|
| 5,267,146 | A | 11/1993 | Shimizu et al. |
| 5,297,054 | A | 3/1994 | Kienzle et al. |
| 5,299,115 | A | 3/1994 | Fields et al. |
| 5,317,503 | A | 5/1994 | Inoue |
| 5,319,541 | A | 6/1994 | Blanchard et al. |
| 5,351,186 | A | 9/1994 | Bullock et al. |
| 5,416,694 | A | 5/1995 | Parrish et al. |
| 5,432,904 | A | 7/1995 | Wong |
| 5,634,021 | A | 5/1997 | Rosenberg et al. |
| 5,734,890 | A | 3/1998 | Case et al. |
| 5,842,193 | A | 11/1998 | Reilly |
| 5,963,910 | A * | 10/1999 | Ulwick ................. 705/7.28 |
| 6,085,165 | A | 7/2000 | Ulwick |
| 6,115,691 | A | 9/2000 | Ulwick |
| 6,240,411 | B1 | 5/2001 | Thearling |
| 6,526,387 | B1 | 2/2003 | Ruffin et al. |
| 6,708,155 | B1 | 3/2004 | Honarvar et al. |
| 6,961,756 | B1 | 11/2005 | Dilsaver et al. |
| 7,039,654 | B1 | 5/2006 | Eder |
| 7,146,359 | B2 | 12/2006 | Castellanos |
| 7,340,409 | B1 * | 3/2008 | Ulwick ................. 705/7.32 |
| 7,533,035 | B1 | 5/2009 | Abend et al. |
| 7,664,670 | B1 | 2/2010 | Weiss |
| 7,689,540 | B2 | 3/2010 | Chowdhury et al. |
| 7,761,427 | B2 | 7/2010 | Martin et al. |
| 7,844,594 | B1 | 11/2010 | Holt et al. |
| 7,904,451 | B2 | 3/2011 | Cobb et al. |
| 7,970,786 | B2 | 6/2011 | Bahrami et al. |
| 8,176,084 | B2 | 5/2012 | Chowdhury |
| 8,190,627 | B2 | 5/2012 | Platt et al. |
| 8,214,238 | B1 | 7/2012 | Fairfield et al. |
| 2002/0016727 | A1 | 2/2002 | Harrell et al. |
| 2002/0049621 | A1 | 4/2002 | Bruce |
| 2002/0099582 | A1 | 7/2002 | Buckley et al. |
| 2002/0120459 | A1 | 8/2002 | Dick et al. |
| 2002/0173998 | A1 | 11/2002 | Case |
| 2003/0033040 | A1 | 2/2003 | Billings |
| 2003/0033191 | A1 | 2/2003 | Davies et al. |
| 2003/0033192 | A1 | 2/2003 | Zyman et al. |
| 2003/0036947 | A1 | 2/2003 | Smith et al. |
| 2003/0083914 | A1 | 5/2003 | Marvin, III et al. |
| 2003/0110067 | A1 | 6/2003 | Miller et al. |
| 2003/0115094 | A1 | 6/2003 | Ammerman et al. |
| 2003/0135399 | A1 | 7/2003 | Ahamparam et al. |
| 2003/0139828 | A1 | 7/2003 | Ferguson et al. |
| 2003/0187707 | A1 | 10/2003 | Hack et al. |
| 2004/0093244 | A1 | 5/2004 | Hatcher et al. |
| 2004/0117234 | A1 | 6/2004 | Lindsay-Scott et al. |
| 2004/0143470 | A1 | 7/2004 | Myrick et al. |
| 2004/0193476 | A1 | 9/2004 | Aerdts |
| 2004/0204980 | A1 | 10/2004 | Swedberg et al. |
| 2004/0230397 | A1 | 11/2004 | Chadwick |
| 2004/0230464 | A1 | 11/2004 | Bliss et al. |
| 2004/0236621 | A1 | 11/2004 | Eder |
| 2005/0026119 | A1 | 2/2005 | Ellis et al. |
| 2005/0096950 | A1 | 5/2005 | Caplan et al. |
| 2005/0114829 | A1 | 5/2005 | Robin et al. |
| 2005/0228824 | A1 | 10/2005 | Gattuso et al. |
| 2005/0240511 | A1 | 10/2005 | Chadwick et al. |
| 2006/0080326 | A1 | 4/2006 | Akbay et al. |
| 2006/0085255 | A1 | 4/2006 | Hastings et al. |
| 2006/0149764 | A1 | 7/2006 | Burchfield et al. |
| 2006/0200423 | A1 | 9/2006 | Powell |
| 2006/0206374 | A1 | 9/2006 | Asthana et al. |
| 2006/0277156 | A1 | 12/2006 | Merican |
| 2006/0287937 | A1 | 12/2006 | Flinn et al. |
| 2007/0038501 | A1 | 2/2007 | Lee et al. |
| 2007/0038627 | A1 | 2/2007 | Cohn et al. |
| 2007/0050198 | A1 | 3/2007 | Ledford et al. |
| 2007/0078692 | A1 * | 4/2007 | Vyas ................. 705/7 |
| 2007/0083385 | A1 | 4/2007 | Patterson et al. |
| 2007/0083421 | A1 | 4/2007 | McNair et al. |
| 2007/0106520 | A1 | 5/2007 | Akkiraju et al. |
| 2007/0129981 | A1 | 6/2007 | Jang et al. |
| 2007/0156382 | A1 | 7/2007 | Graham et al. |
| 2007/0162316 | A1 | 7/2007 | Kratschmer et al. |
| 2007/0179833 | A1 | 8/2007 | Moorthy et al. |
| 2007/0282666 | A1 | 12/2007 | Afeyan et al. |
| 2007/0282667 | A1 | 12/2007 | Cereghini et al. |
| 2008/0021844 | A1 | 1/2008 | Sanwal et al. |
| 2008/0114608 | A1 | 5/2008 | Bastien |
| 2008/0114628 | A1 | 5/2008 | Johnson et al. |
| 2008/0133316 | A1 | 6/2008 | Sarkar |
| 2008/0167936 | A1 | 7/2008 | Kapoor |
| 2008/0205692 | A1 * | 8/2008 | Hinkle et al. ................. 382/100 |
| 2008/0208648 | A1 | 8/2008 | Linder et al. |
| 2008/0249825 | A1 | 10/2008 | Kunjur et al. |
| 2008/0256069 | A1 | 10/2008 | Eder |
| 2008/0294534 | A1 * | 11/2008 | Brown et al. ................. 705/27 |
| 2008/0312980 | A1 | 12/2008 | Boulineau et al. |
| 2008/0313596 | A1 | 12/2008 | Kreamer et al. |
| 2008/0319811 | A1 | 12/2008 | Casey |
| 2008/0319958 | A1 | 12/2008 | Bhattacharya et al. |
| 2009/0018891 | A1 | 1/2009 | Eder |
| 2009/0070160 | A1 | 3/2009 | Kasravi et al. |
| 2009/0112686 | A1 | 4/2009 | Sheehan et al. |
| 2009/0138322 | A1 | 5/2009 | Joyner et al. |
| 2009/0144127 | A1 | 6/2009 | Smith |
| 2009/0157569 | A1 | 6/2009 | Henby et al. |
| 2009/0259521 | A1 | 10/2009 | Yitts |
| 2010/0070348 | A1 | 3/2010 | Nag |
| 2010/0125475 | A1 | 5/2010 | Twyman |
| 2010/0125566 | A1 | 5/2010 | Gibbs et al. |
| 2010/0145951 | A1 | 6/2010 | Van Coeverden De Groot et al. |
| 2010/0153183 | A1 * | 6/2010 | Ulwick ................. 705/10 |
| 2010/0179951 | A1 | 7/2010 | McPhail |
| 2011/0029514 | A1 | 2/2011 | Kerschberg et al. |
| 2011/0040750 | A1 | 2/2011 | Safra et al. |
| 2011/0087698 | A1 | 4/2011 | Iguchi |
| 2011/0161054 | A1 | 6/2011 | Woolf et al. |

OTHER PUBLICATIONS

Search Report and Written Opinion mailed Sep. 28, 2010 from International Serial No. PCT/US2010/026858 filed Mar. 10, 2010.
Co-pending U.S. Appl. No. 13/319,066, filed Nov. 4, 2011.
Office Action mailed Oct. 7, 2011 from U.S. Appl. No. 12/253,433, filed Oct. 17, 2008.
Office Action mailed Nov. 16, 2011 from U.S. Appl. No. 12/476,160, filed Jun. 1, 2009.
Office Action mailed Dec. 20, 2011 from U.S. Appl. No. 12/592,715, filed Nov. 30, 2009.
GartnerGroup Executive Services, "Executive Market Analysis Program, Today's Market Program demands Better Analysis", pp. 11-36 (first provided to clients in Nov. 1993).
Saaty, "Decision Making for Leaders", pp. 1-33, 1988.
Vincze, "Expert Choice", pp. 10-12, Mar. 1990.
Von Hippel, "Democratizing Innovation", MIT Press, Apr. 2005.
Chesbrough, "Open Innovation, The New Imperative for Creating and Profiting from Technology", Harvard Business School Press, 2003.
Harrison et al., "Edison in the Boardroom. Moving Beyond Intellectual Capital to I-Stuff", John Wiley & Sons, Inc., 2006.
Davis et al., "Edison in the Boardroom, How Leading Companies Realize Value from Their Intellectual Assets", John Wiley & Sons, 2001.
Fuelling, "Manufacturing, Selling and Accounting: Patenting Business Methods", 76 Journal of the Patent and Trademark Office Society, Jul. 1994, pp. 471-507.
Ulwick, "Turn Customer Input into Innovation", Harvard Business Review, Jan. 2002, pp. 5-11.
Lyman et al., "Deployment Normalization", International TechneGroup Incorporation, 1990, pp. 1-7.
Strategyn, Inc., "CD-Map®, An Advanced Technology for Strategy Formulation", 1998, pp. 1-37.
Strategyn, Inc., "Sample Project Reports, Presenting the Results of a CD-MAP®, XYZ Company, CD-MAP® Project Final Report, Formulating a Strategy to Improve the Product Development Process", pp. 1-26 and "XYZ Company, CD-MAP® Project Final Report, Evaluating the Attractiveness of Alternative Market Segments", 1998, pp. 1-23.
Ulwick, "The Intellectual Revolution, Applying Advanced Technology to Strategy Formulation, Planning and Decision Marking", Strategyn, Inc., Manuscript Version 030698, 1997, pp. 1-166.

Co-pending U.S. Appl. No. 12/476,160, filed Jun. 1, 2009.
Co-pending U.S. Appl. No. 08/763,668, filed Dec. 11, 1996.
Co-pending U.S. Appl. No. 08/716,948, filed Sep. 20, 1996.
Co-pending U.S. Appl. No. 09/385,661, filed Aug. 27, 1999.
Co-pending U.S. Appl. No. 09/652,576, filed Aug. 31, 2000.
Co-pending U.S. Appl. No. 10/235,285, filed Sep. 5, 2002.
Co-pending U.S. Appl. No. 12/592,715, filed Nov. 30, 2009.
Co-pending U.S. Appl. No. 12/253,433, filed Oct. 17, 2008.
Notice of Allowance Mailed Mar. 1, 1999 in Co-pending U.S. Appl. No. 08/763,668 filed Dec. 11, 1996.
Non-Final Office Action Mailed Sep. 16, 1998 in Co-pending U.S. Appl. No. 08/763,668 filed Dec. 11, 1996.
Notice of Allowance Mailed Mar. 1, 1999 in Co-pending U.S. Appl. No. 08/716,948 filed Sep. 20, 1996.
Non-Final Office Action Mailed Sep. 17, 1998 in Co-pending U.S. Appl. No. 08/716,948 filed Sep. 20, 1996.
Notice of Allowance Mailed Mar. 27, 2000 in Co-pending U.S. Appl. No. 09/385,661 filed Aug. 27, 1999.
Notice of Allowance Mailed Oct. 11, 2007 in Co-pending U.S. Appl. No. 09/652,576 filed Aug. 31, 2000.
Non-Final Office Action Mailed Mar. 14, 2006 in Co-pending U.S. Appl. No. 09/652,576 filed Aug. 31, 2000.
Advisory Action Mailed Nov. 30, 2005 in Co-pending U.S. Appl. No. 09/652,576 filed Aug. 31, 2000.
Final Office Action Mailed Jul. 27, 2006 in Co-pending U.S. Appl. No. 09/652,576 filed Aug. 31, 2000.
Non-Final Office Action Mailed Jul. 26, 2004 in Co-pending U.S. Appl. No. 09/652,576 filed Aug. 31, 2000.
Final Office Action Mailed May 28, 2009 in Co-pending U.S. Appl. No. 10/235,285 filed Sep. 5, 2002.
Non-Final Office Action Mailed Apr. 4, 2008 in Co-pending U.S. Appl. No. 10/235,285 filed Sep. 5, 2002.
Co-pending U.S. Appl. No. 12/800,652, filed May 18, 2010.
Non-Final Office Action mailed Sep. 28, 2012 in U.S. Appl. No. 13/020,546 filed Feb. 3, 2011.
Non-Final Office Action mailed Nov. 6, 2012 in U.S. Appl. No. 13/533,689 filed Jun. 26, 2012.
Auchey, Flynn L et al., "Using PRISM to Quantify Qualitative Data," AACE International Transactions, pp. RI11-RI17, 2006.
Campion, Michael A. et al., "Neglected Questions in Job Design: How People Design Jobs, Task-Job Predictabillity, and Influence of Training," Journal of Business and Psychology, vol. 6, No. 2, pp. 169-191, Winter 1991.
Kaeli, James K., "A Company-Wide Perspective to Identify, Evaluate and Rank the Potential for CIM (Computer Integrated Manufacturing)," Industrial Engineering, vol. 22, No. 7, pp. 23-26, Jul. 1990.
Notice of Allowance mailed Apr. 19, 2012 in U.S. Appl. No. 12/476,160 filed Jun. 1, 2009.
Final Office Action mailed Jul. 2, 2012 in U.S. Appl. No. 12/592,715 filed Nov. 30, 2009.
Non-Final Office Action mailed Aug. 23, 2012 in U.S. Appl. No. 12/800,652 filed May 18, 2010.
European Patent Application No. 10751374.9, Search Report mailed May 2, 2013.

* cited by examiner

UNIVERSAL CUSTOMER BASED INFORMATION AND ONTOLOGY PLATFORM FOR BUSINESS INFORMATION AND INNOVATION MANAGEMENT

CROSS-REFERENCE TO RELATED APPLICATIONS

This application claims priority to U.S. Provisional Patent Applications 61/098,690 filed Sep. 19, 2008, and 61/209,764 filed Mar. 10, 2009, both of which are incorporated by reference.

BACKGROUND

Today's modern business enterprises require and make use of sophisticated information systems to acquire vital insights into the performance or prospective future performance of their business relative to goals, market metrics, competitive information, and the like. This class of information products is known in the field today as Management Information Systems (MIS) or Business Intelligence (BI) tools. In addition businesses seek better ways to identify the right strategies and new ideas that can help them grow, and information solutions supporting these objectives are often referred to as Collaboration Technologies, and Innovation Management Systems. Collectively these information systems fall under the general category of Enterprise and Marketing Intelligence Systems and represent a critical part of today's business software and information systems marketplace.

While data management and reporting technologies have advanced to become adept at efficiently retrieving information stored in these systems and generating reports, the problem that plagues all these systems is the lack of a unifying information framework, or ontology, that provides a stable and fundamental frame of reference that is absolute and consistently meaningful across all domains for gleaning business insights or for facilitating value creation. The lack of an ontology means that evaluations on the information gathered are highly subjective and dependent on interpretation, and that each information domain tends to exist as an island where local rules prevail, rather than as a part of an integrated whole. The problems this creates for business are innumerable; consequently MIS and BI systems today, while enabling better informed decisions, have failed to deliver on their promise of transforming management decision making. For example, these systems can easily track the sales results and underlying demographics for a particular market, but utterly fail at providing any empirically defensible prediction, save extrapolation of past results, around whether these results are sustainable or what impact a new idea will have. More generally, the lack of a valid unifying and quantifiable frame of reference for business insight and intelligence means that compromises are made in making decisions and projections into future business impacts are largely guesswork. This problem has always existed in business information analysis and decision making, and it is a root cause of many mistaken beliefs and failures in business information technology initiatives.

An example of market modeling created by Anthony Ulwick and called Outcome Driven Innovation (ODI) creates an empirically valid estimator of market demand by holistically identifying the Jobs that customers and key participants in the consumption chain are trying to get done in a particular market and then collecting quantitative data on Importance and satisfaction levels associated with all of these jobs and with the desired outcomes associated with a specific core job of interest. This data is then analyzed to identify needs that are underserved (representing opportunities for new products and services) and those that are over-served (representing areas that are ready for being disrupted). A proprietary index called the opportunity score is used to determine the strength of the underlying market conditions driving these findings, and this score has been shown to be a valid empirical estimator of customer demand/sentiment and hence the consequential business value of fulfilling the market needs appropriately. The practice of researching and analyzing markets in this fashion is what is referred to as the ODI methodology.

The ODI methodology possesses four critical attributes that collectively make it uniquely valuable for business analysis. First, the use of the Jobs framework facilitates the description of an interaction a customer or key influencer may have with current or yet-to-be designed products and services and the measurement of these in a meaningful unit of analysis. This is important to obtaining insights and making informed decisions on questions where the objects of interest are parts of interconnected systems like in virtually all business matters. Today's MIS, BI, and Innovation Management systems lack this unifying framework and so do little to facilitate meaningful comparisons and analyses within and across the inherently disparate information domains of the system (e.g. competitive information, customer market information, product management information, R&D, etc.). Second, the measurement system used by the methodology provides direct quantitative measurement of the fundamental driver of business outcomes—customer demand, and this measurement system is both reproducible and repeatable. Third, the actual measurements taken are internally consistent; that is they report on the same dimensions of importance and satisfaction irrespective of whether jobs or outcomes are being studied and whether the job of interest is a functional job, an emotional job, or a related job. This therefore means that the methodology enables disparate variables of successful business endeavors, such as emotional factors, functional factors, and performance factors, to be compared directly to one another for prioritization without transformation. And fourth, the numerical data collected are normalized by an indexing method to have the same market meaning regardless of the factor being studied and are scaled in a manner that directly reflects the significance of the metric in market terms. This ensures that comparisons across factors are not just qualitatively valid but also quantitatively correct and easily extrapolated to real business impacts. For these reasons the foundation of ODI presents an information platform for business analysis that is fundamentally superior to all constructs that have preceded it.

SUMMARY

Presented herein are techniques for providing a valid unifying ontology to organize business intelligence and innovation assessments. Using one of these techniques, an entity can, for example, evaluate its position in absolute terms relative to markets, and competitors. It can confidently identify new product opportunities and assess the threat from changes affecting its markets. It can quantify future economic value and uncertainty of development investments and provide important information to capital markets related to its asset value compared to others in its sectors. If the ontology requires information to be gathered that is different from other forms commonly collected, the business could develop a new strategic competitive advantage through the act of gathering the information itself that will be difficult and time consuming for competitors to copy. Taken collectively, creating and commercializing a unifying ontology for business as taught herein is truly transformational to business systems.

A system constructed using one or more of the techniques includes a collective set of data structures, uniquely designed entities, information tools, and computational and machine methods useful to store, append, interact with, retrieve, process, and present data and information in a fashion that enables associations to be made between the entities and the particular Jobs and Outcomes that pertain to the underlying markets, or possible markets, of an enterprise which have been identified by separate analysis following an Outcome Driven Innovation (ODI) methodology. Through the associations, users can attain insights and explore innovations and new business strategies that are virtually unworkable without the system. The use of the system comprises both pre-formed "canned" reports, and interactive "ad-hoc" queries for original analysis and to facilitate guided collaboration in a computer assisted fashion.

Processes/decisions that can potentially be improved using a technique described in the detailed description can include, for example, Primary Market Research, Use of Secondary Market Research, Product Management and Marketing Strategy, Marketing Communications, R&D, New Product Development, General Business Strategy, Innovation Strategy, Innovation Collaboration, Ideation, Business Case Analysis, IP Strategy, and Mergers & Acquisition Strategy and Due Diligence. Business insights that can potentially be improved using a technique described in the detailed description can include, for example, Competitive Intelligence and Industry Benchmarking, Unmet Market Demand, Modeling of underlying market trends, Cause and Effect of Marketing Communications Results, New Technology Assessments and Scouting, and New Product/Platform or other Growth Investment Risk/Return. These improvements are intended to be examples, not limitations, and some of them may not be achieved in certain implementations of the techniques.

DETAILED DESCRIPTION

Figure 1:
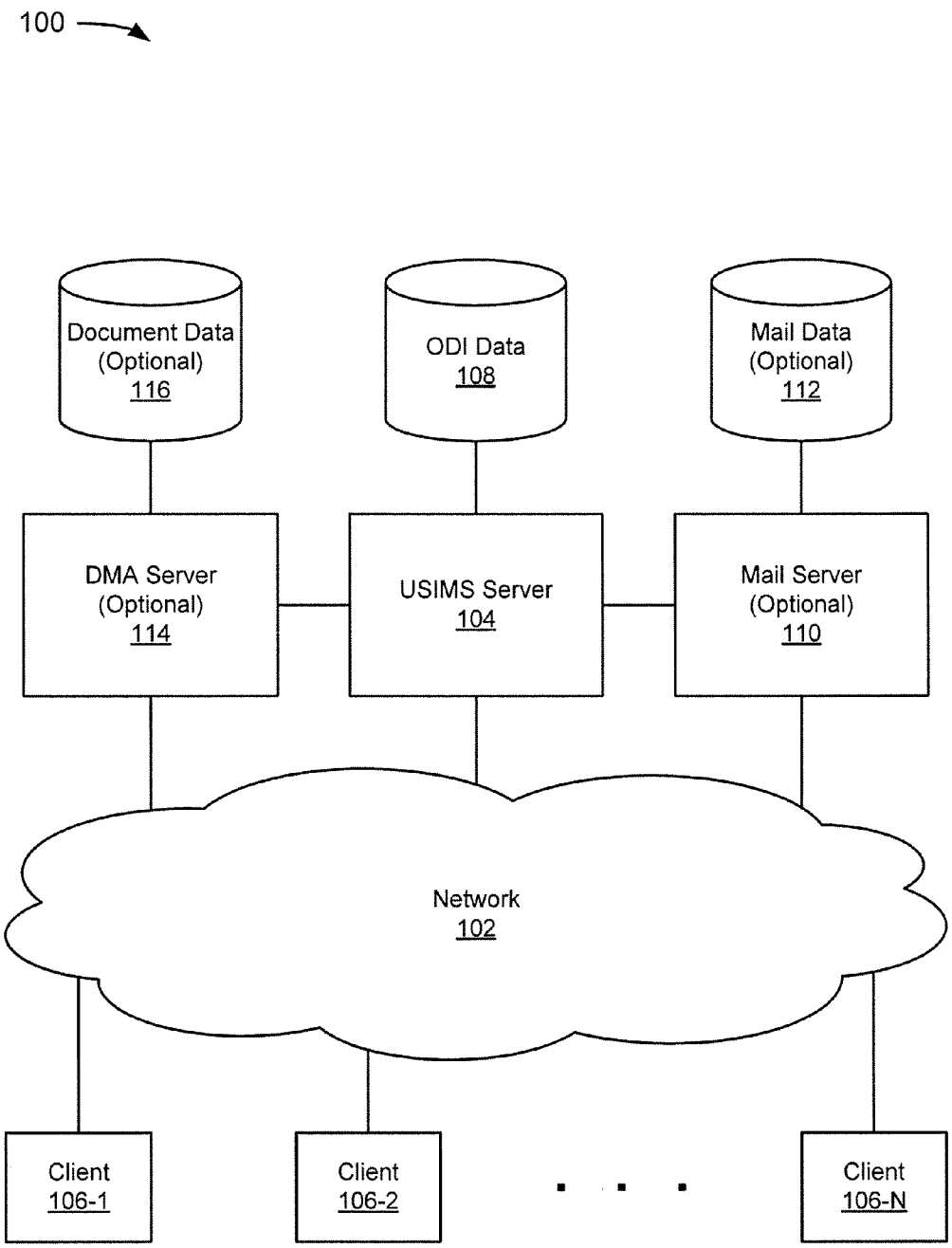
FIG. 1 depicts an example of a system including a universal strategy and innovation management system (USIMS) server.

FIG. 1 depicts an example of a system 100 including a universal strategy and innovation management system (USIMS) server. In the example of FIG. 1, the system 100 includes a network 102, a USIMS server 104, clients 106-1 to 106-N (referred to collectively as the clients 106), an Outcome Driven Innovation (ODI) data repository 108, and optional components including: a mail server 110, a mail data repository 112, a document management applications (DMA) server 114, and a document data repository 116.

In the example of FIG. 1, the network 102 can include a networked system that includes several computer systems coupled together, such as the Internet. The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the World Wide Web and is coupled to the Internet. The physical connections of the Internet and the protocols and communication procedures of the Internet and the web are well known to those of skill in the relevant art. For illustrative purposes, it is assumed the network 102 broadly includes, as understood from relevant context, anything from a minimalist coupling of the components, or a subset of the components, illustrated in the example of FIG. 1, to every component of the Internet and networks coupled to the Internet.

A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor.

The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable storage medium." A processor is considered to be "configured to execute a program" when at least one value associated with the program is stored in a register readable by the processor.

The bus can also couple the processor to the interface. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device.

In one example of operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. The signals take on physical form when stored in a computer readable storage medium, such as memory or non-volatile storage, and can therefore, in operation, be referred to as physical quantities. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it should be appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical quantities within the computer system's registers and memories into other data similarly represented as physical quantities within the computer system memories or registers or other such information storage, transmission or display devices.

The algorithms and displays presented herein are not necessarily inherently related to any particular computer or other apparatus. Various general purpose systems may be used with programs to configure the general purpose systems in a specific manner in accordance with the teachings herein, or it may prove convenient to construct specialized apparatus to perform the methods of some embodiments. The required structure for a variety of these systems will appear from the description below. Thus, a general purpose system can be specifically purposed by implementing appropriate programs. In addition, the techniques are not described with reference to any particular programming language, and various embodiments may thus be implemented using a variety of programming languages.

Referring once again to the example of FIG. 1, in the example of FIG. 1, the USIMS server 104 is coupled to the network 102. The USIMS server 104 can be implemented on a known or convenient computer system, specially purposed to provide USIMS functionality. The USIMS server 104 is intended to illustrate one server that has the novel functionality, but there could be practically any number of USIMS servers coupled to the network 102 that meet this criteria. Moreover, partial functionality might be provided by a first server and partial functionality might be provided by a second server, where together the first and second server provide the full functionality.

Functionality of the USIMS server 104 can be carried out by one or more engines. As used in this paper, an engine includes a dedicated or shared processor and, hardware, firmware, or software modules that are executed by the processor. Depending upon implementation-specific or other considerations, an engine can be centralized or its functionality distributed. An engine can include special purpose hardware, firmware, or software embodied in a computer-readable medium for execution by the processor. Examples of USIMS functionality are described with reference to FIGS. 4-24.

In the example of FIG. 1, the clients 106 are coupled to the network 102. The clients 106 can be implemented on one or more known or convenient computer systems. The clients 106 use the USIMS functionality provided by the USIMS server 104. Depending upon the implementation and/or preferences, the clients 106 can also carry out USIMS functionality. Depending upon the implementation and/or preferences, in addition to or instead of using the USIMS functionality provided by the USIMS server 104, the clients 106 can provide ODI or other useful data to the USIMS server 104. The clients 106 can also be USIMS-agnostic, and take advantage of USIMS functionality without implementing any novel functionality on their own.

In the example of FIG. 1, the ODI data repository 108 is coupled to the USIMS server 104. The ODI data repository 108 has data that is useful to the USIMS server 104 for providing the USIMS functionality. The ODI data repository 108 can store data entities, such as those described later with reference to FIG. 24. The ODI data repository 108, and other repositories described in this paper, can be implemented, for example, as software embodied in a physical computer-readable medium on a general- or specific-purpose machine, in firmware, in hardware, in a combination thereof, or in any applicable known or convenient device or system. This and other repositories described in this paper are intended, if applicable, to include any organization of data, including tables, comma-separated values (CSV) files, traditional databases (e.g., SQL), or other known or convenient organizational formats.

In an example of a system where the ODI data repository 108 is implemented as a database, a database management system (DBMS) can be used to manage the ODI data repository 108. In such a case, the DBMS may be thought of as part of the ODI data repository 108 or as part of the USIMS server 104, or as a separate functional unit (not shown). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, File-Maker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to, typically, a specifically programmed processor. With most DBMS implementations, there is one physical view and a huge number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases, and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

In the example of FIG. 1, the optional mail server 110 is coupled to the network 102, to the USIMS server 104, and to the mail data repository 112. The mail data repository 112 stores data in a format that is useful to the mail server 110. In this example, the mail server 110 is considered an "external application" in the sense that the format of data in the mail data repository 112 is not necessarily in the same format as in the ODI data repository 108. To the extent mail data is used by the USIMS server 104 in this example, it is assumed that the mail data has been translated into a format that is useful to the USIMS server 104, which may or may not be necessary depending upon the implementation. For example, in another implementation, the mail server 110 could be implemented as an integrated application in the sense that the format of data in the mail data repository 112 is in the same format as in the ODI data repository 108. In this implementation, it is possible that no translation of the data stored in the mail data repository 112 into another format would be necessary.

Particularly where the USIMS server 104 functions as a business process management (BPM) server, it may be desirable to enable the USIMS server 104 to have access to mail data. BPM, as used in this paper, is a technique intended to align organizations with the needs of clients by continuously improving processes. BPM is an advantageous implementation because it tends to promote business efficacy while striving for innovation and integration with technology.

It should be noted that business process modeling and business process management are not the same, and, confusingly, share the same acronym. In this paper, business process management is given the acronym BPM, but business process modeling is not given an acronym. Business process modeling is often, though not necessarily, used in BPM. Business process modeling is a way of representing processes in systems or software. The models are typically used as tools to improve process efficiency and quality, and can use Business Process Modeling Notation (BPMN) or some other notation to model business processes.

A business process, as used in this paper, is a collection of related, structured activities or tasks that produce a service or product for a particular client. Business processes can be categorized as management processes, operational processes, and supporting processes. Management processes govern the operation of a system, and include by way of example but not limitation corporate governance, strategic management, etc. Operational processes comprise the core business processes for a company, and include by way of example but not limitation, purchasing, manufacturing, marketing, and sales. Supporting processes support the core processes and include, by way of example but not limitation, accounting, recruiting, technical support, etc.

A business process can include multiple sub-processes, which have their own attributes, but also contribute to achieving the goal of the super-process. The analysis of business processes typically includes the mapping of processes and sub-processes down to activity level. A business process is sometimes intended to mean integrating application software tasks, but this is narrower than the broader meaning that is frequently ascribed to the term in the relevant art, and as intended in this paper. Although the initial focus of BPM may have been on the automation of mechanistic business processes, it has since been extended to integrate human-driven processes in which human interaction takes place in series or parallel with the mechanistic processes.

Referring once again to the example of FIG. 1, the optional DMA server 114 is coupled to the network 102, to the USIMS server 104, and to the document data repository 116. The document data repository 116 stores data in a format that is useful to the DMA server 114. In this example, the DMA server 114 is considered an "external application" in the sense that the format of data in the document data repository 116 is not necessarily in the same format as in the ODI data repository 108. To the extent document data is used by the USIMS server 104 in this example, it is assumed that the document data has been translated into a format that is useful to the USIMS server 104, which may or may not be necessary depending upon the implementation. For example, in another implementation, the DMA server 114 could be implemented as an integrated application in the sense that the format of data in the document data repository 116 is in the same format as in the ODI data repository 108. In this implementation, it is possible that no translation of the data in the document data repository 116 into another format would be necessary.

The USIMS server 104 can, of course, be coupled to other external applications (not shown) either locally or through the network 102 in a known or convenient manner. The USIMS server 104 can also be coupled to other external data repositories.

Figure 2:
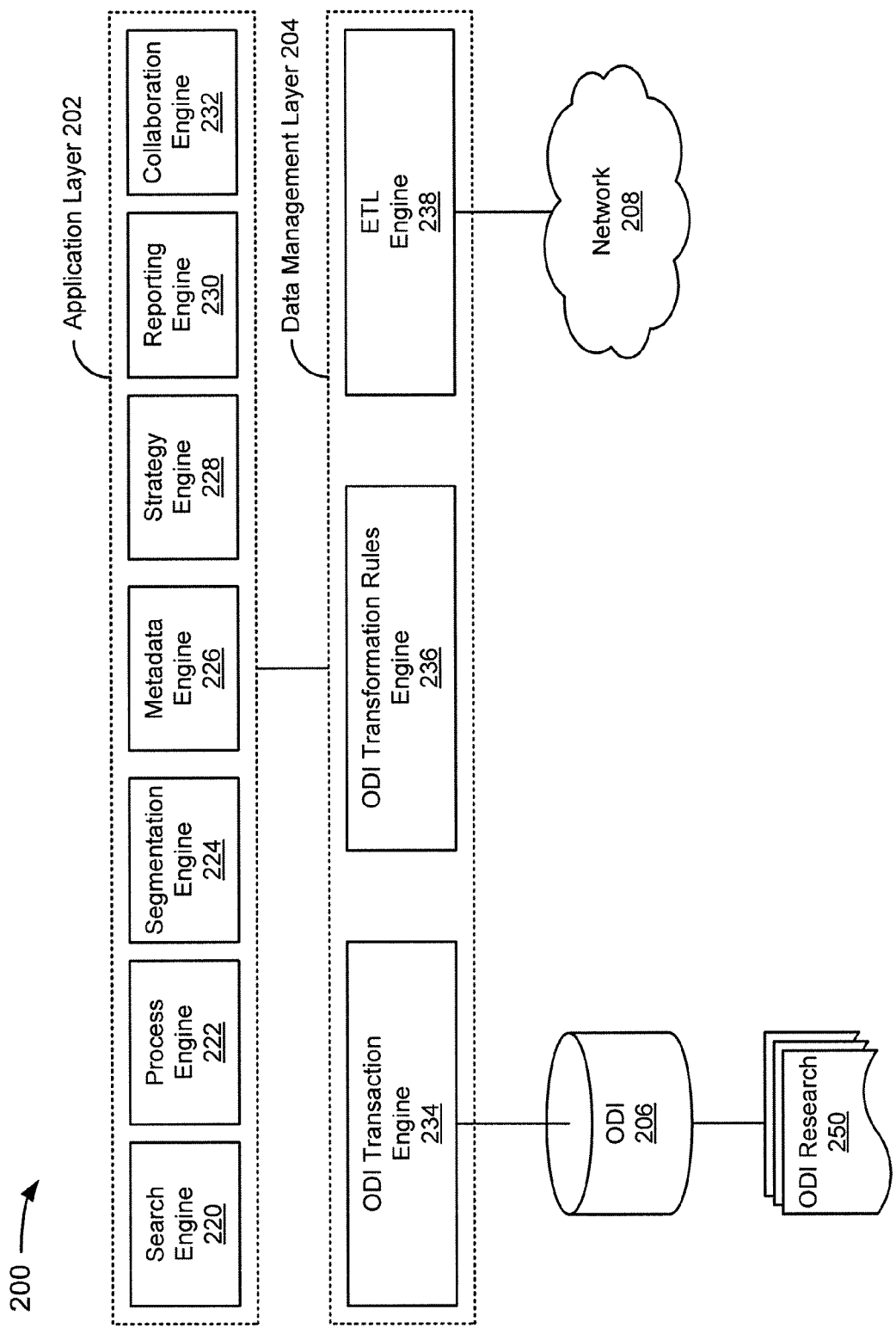
FIG. 2 depicts an example of a USIMS system.

FIG. 2 depicts an example of a USIMS system 200. In the example of FIG. 2, the system 200 includes an application layer 202; a data management layer 204; an ODI repository 206; and a network 208. The system 200 can provide a metadata environment to capture tags and links to other data stored in the system 200, and an ETL designed to extract data from ERP or other enterprise data sources, transform the data, and load the data into a structured repository. The structured repository uses ODI data (Jobs and Outcomes) as a reference model that organizes the disparate data.

The Application Layer is the top protocol layer in both major models of computer networking, the Transmission Control Protocol (TCP)/Internet Protocol (IP) model and the Open Systems Interconnection (OSI) model. In TCP/IP, the Application Layer contains protocols and methods that fall into the realm of process-to-process communications via an IP network using Transport Layer protocols to establish underlying host-to-host connections. In the OSI model, the definition of the Application Layer is narrower, distinguishing explicit functionality on top of the Transport Layer at two additional levels, the Presentation Layer and the Session Layer. Common application layer services, such as by way of example but not limitation, virtual file, virtual terminal, and job transfer and manipulation protocols, can provide semantic conversion between application processes. As used in this paper, the application layer 202 can be associated with the TCP/IP model, the OSI model, some other applicable known or convenient model, or no model at all. In the example of FIG. 2, the application layer 202 includes a search engine 220, a process engine 222, a segmentation engine 224, a metadata engine 226, a strategy engine 228, a reporting engine 230, and a collaboration engine 232.

In the example of FIG. 2, the search engine 220 can include one or more communications protocols. An example of one such protocol is the financial information exchange (FIX) protocol for electronic communication of trade-related messages. It is a self-describing protocol in many ways similar to other self-describing protocols such as XML. (XML representation of business content of FIX messages is known as FIXML.) FIX Protocol, Ltd. was established for the purpose of ownership and maintenance of the specification and owns the specification, while keeping it in the public domain.

FIX is provided as an example in this paper because FIX is a standard electronic protocol for pre-trade communications and trade execution. Another example of a protocol is Society for Worldwide Interbank Financial Telecommunication (SWIFT).

Yet another example is FIX adapted for streaming (FAST) protocol, which is used for sending multicast market data. FAST was developed by FIX Protocol, Ltd. to optimize data representation on a network, and supports high-throughput, low latency data communications. In particular, it is a technology standard that offers significant compression capabilities for the transport of high-volume market data feeds and ultra low latency applications. Exchanges and market centers offering data feeds using the FAST protocol include: New York Stock Exchange (NYSE) Archipelago, Chicago Mercantile Exchange (CME), International Securities Exchange (ISE), to name a few.

In operation, the search engine 220 can search data streams for relevant data for tagging; identifying competitors; and populating product, market communications, service programs, NPD tables, etc. FAST is a good example protocol because of its use in market-related communications that are reasonably likely to be relevant to those who use one or more of the techniques described in this paper.

In the example of FIG. 2, the process engine 222 can be implemented as a BPM engine or a BPM suite (BPMS). An example of a BPMS is Bluespring's BPM Suite 4.5. However, any applicable known or convenient BPM engine could be used. Of course, the BPM engine must meet the needs of the system for which it is used, and may or may not work "off the shelf" with techniques described in this paper.

In the example of FIG. 2, the segmentation engine 224 facilitates segmenting a market. This can involve providing data manipulation tools to facilitate compiling and loading data sets into external statistical analysis packages, providing tools to interact with statistical analysis and modeling packages and import additional metadata tags into a job/outcome data schema, and/or providing utilities to enhance the visual representation and tabular reporting of the statistical data properties.

In the example of FIG. 2, the metadata engine 226 can be implemented as a data analysis engine that tags data records algorithmically, appends meta-data associated with business information to data records, facilitates pipeline prioritization, facilitates calculation, ranking and reporting of opportunity scores, facilitates interaction with data, and performs other functionality that makes data more useful in a BI context.

In the example of FIG. 2, the strategy engine 228 can be implemented as a business intelligence (BI) tool. An example of a BI tool is Microsoft Office PERFORMANCEPOINT® Server. An advantage of PerformancePoint® is that it is integrated with other Microsoft Office products, such as Excel, Visio, SQL Server, SHAREPOINT® Server, and the like, and has monitoring and analytic capabilities (e.g., Dashboards, Scorecards, Key Performance Indicators (KPI), Reports, Filters, and Strategy Maps), and planning and budgeting capabilities. Using the toolset, one can create data source connections, create views that use the data source connections, assemble the views in a dashboard, and deploy the dashboard to Microsoft Office SHAREPOINT® Server 2007 (MOSS) or Windows SHAREPOINT® Services, and can save content and security information to a SQL sever database. Using the toolset, one can also define, modify, and maintain logical business models integrated with business rules, workflows, and enterprise data. It should be noted that the scope of the PERFORMANCEPOINT® product has grown with time, and some of the capabilities may seem to overlap with some of the other engines in the Application Layer 202.

In general, the strategy engine 228 can include tools that are useful for pulling in data from various sources so as to facilitate strategic planning, such as needs delivery enhancement strategy, needs-based IP strategy, innovation strategy, market growth strategy, consumption chain improvement strategy, etc. It is probably desirable to ensure that the tools in the strategy engine 228 are user-friendly, since human input is often desirable for certain strategic planning.

In the example of FIG. 2, the reporting engine 230 can be implemented as Microsoft SQL Server Reporting Services (SSRS) to prepare and deliver interactive and printed reports. Crystal Reports is another implementation, and any applicable known or convenient BI tool could be used. It is frequently seen as an advantage to have reports that can be generated in a variety of formats including Excel, PDF, CSV, XML, TIFF (and other image formats), and HTML Web Archive, which SSRS can do. Other report generators can offer additional output formats, and may include useful features such as geographical maps in reports.

In the example of FIG. 2, the collaboration engine 232 can be implemented as a MOSS. It should be noted that Windows SHAREPOINT® Services (WSS) might actually provide adequate functionality to serve as a collaboration engine, but the MOSS can bolted on top to provide additional services and functionality. MOSS and similar technologies can include browser-based collaboration and document management, plus the ability to host web sites that access shared workspaces and documents, as well as specialized applications like wikis and blogs; and tools can enable the MOSS to serve as a social networking platform. There are many conventional collaboration tools that could be used as or as part of the collaboration engine 230 implementation, including, by way of example but not limitation, adenine IntelliEnterprise, Alfresco, Nuxeo, Cisco WebEx Connect, Liferay portal, Drupal, eXo Platform, IBM Lotus Notes, O3spaces, OnBase, Novell—Teaming and Conferencing link, Open Text Corporation's Livelink ECM—Extended Collaboration, Oracle Collaboration Suite, MediaWiki, and Atlassian Confluence.

In general, any applicable known or convenient tool that acts as a collaborative workspace and/or tool for the management or automation of business processes could be implemented. Collaborative technologies are tools that enable people to interact with other people within a group more efficiently and effectively. So even email discussion lists and teleconferencing tools could function as a collaboration engine 230; though sophisticated tools are likely to encompass much more. For example, it is probably desirable to enable users to have greater control in finding, creating, organizing, and collaborating in a browser-based environment. It may also be desirable to allow organization of users in accordance with their access, capabilities, role, and/or interests.

In the example of FIG. 2, the data management layer 204 is coupled to the application layer 202. Strictly speaking, the data management layer 204 would probably be considered part of the application layer in a computer networking model. In this paper, a distinction is drawn between "core applications" that perform core customer-based ontology and delivery functions, and interfaces to repositories and applications that support the management of data in the repositories to make the data useful to the core applications. In the example of FIG. 2, the data management layer 204 includes an ODI transaction engine 234, an ODI transformation rules engine 236, and an extract, transform, load (ETL) engine 238. The ODI transaction engine 234 is coupled to the ODI repository 206 and the ETL engine 238 is coupled to the network 208, which is, at least in some implementations, coupled to applicable known or convenient ETL repositories (not shown).

The ODI transaction engine 234 provides interaction between engines capable of writing to or reading from the ODI repository 206. If a data stream is being provided, the ODI transformation rules engine 236 may or may not transform the data into an appropriate ODI format. Similarly, if data is being provided from the ODI repository 206 to an engine that can make no, or limited, use of the ODI data, the ODI transformation rules engine 236 can transform the data from the ODI format to some other format. In a specific implementation, the ODI transformation rules engine 236 is only needed when interfacing with external devices because all internal devices can use data in the ODI format.

The ETL engine 238 extracts data from outside sources, transforms the data to fit operational requirements, and loads the transformed data into an internal repository (e.g., the ODI repository 206). The ETL engine 238 can store an audit trail, which may or may not have a level of granularity that would allow reproduction of the ETL's result in the absence of the ETL raw data. A typical ETL cycle can include the following steps: initialize, build reference data, extract, validate, transform, stage, audit report, publish, archive, clean up.

In operation, the ETL engine 238 extracts data from one or more source systems, which may have different data organizations or formats. Common data source formats are relational databases and flat files, but can include any applicable known or convenient structure, such as, by way of example but not limitation, Information Management System (MIS), Virtual Storage Access Method (VSAM), Indexed Sequential Access Method (ISAM), web spidering, screen scraping, etc. Extraction can include parsing the extracted data, resulting in a check if the data meets an expected pattern or structure.

In operation, the ETL engine 238 transforms the extracted data by applying rules or functions to the extracted data to derive data for loading into a target repository. Different data sources may require different amounts of manipulation of the data. Transformation types can include, by way of example but not limitation, selecting only certain columns to load, translating coded values, encoding free-form values, deriving a new calculated value, filtering, sorting, joining data from multiple sources, aggregation, generating surrogate-key values, transposing, splitting a column into multiple columns, applying any form of simple or complex data validation, etc.

In operation, the ETL engine 238 loads the data into the target repository. In a particular implementation, the data must be loaded in a format that is usable to an ODI system, perhaps using the ODI transformation rules engine 236. Loading data can include overwriting existing information or adding new data in historized form. The timing and scope to replace or append are implementation- or configuration-specific.

The ETL engine 238 can make use of an established ETL framework. Some open-source ETL frameworks include Clover ETL, Enhydra Octopus, Mortgage Connectivity Hub, Pentaho Data Integration, Talend Open Studio, Scriptella, Apatar, Jitterbit 2.0. A freeware ETL framework is Benetl. Some commercial ETL frameworks include Djuggler Enterprise, Embarcadero Technologies DT/Studio, ETL Solutions Transformation Manager, Group 1 Software DataFlow, IBM Information Server, IBM DB2 Warehouse Edition, IBM Cognos Data Manager, IKAN—ETL4ALL, Informatica PowerCenter, Information Builders—Data Migrator, Microsoft SQL Server Integration Services (SSIS), Oracle Data Integrator, Oracle Warehouse Builder, Pervasive Business Integrator, SAP Business Objects—Data Integrator, SAS Data Integration Studio, to name several.

A business process management (BPM) server, such as Microsoft BizTalk Server, can also be used to exchange documents between disparate applications, within or across organizational boundaries. BizTalk provides business process automation, business process modeling, business-to-business communication, enterprise application integration, and message broker.

An enterprise resource planning (ERP) system used to coordinate resources, information, and activities needed to complete business processes, can also be accessed. Data derived from an ERP system is typically that which supports manufacturing, supply chain management, financials, projects, human resources, and customer relationship management from a shared data repository.

Derived data can also be Open Innovation (OI) data, which is an outside source of innovation concepts. This can include transactional data (send a network of outside problem solvers Opportunities for new ideas and receive the ideas back) and unstructured data (repository of ideas) for searching.

In the example of FIG. 2, the ODI repository 206 includes data associated with customers, including customer profile, customer jobs region, and customer outcomes region. In a specific implementation, a customer profile region can include customer profile records that include customer identifier (ID) and profile attributes. The customer ID can be in accordance with a public key infrastructure (PKI). The profile attributes can include fields associated with, for example, demographics, customer of . . . , products used, job role, customer chain role, consumption chain role, outcome-driven segments, and attitudinal segments. The customer jobs region can include a customer type code (note that customer ID and customer type code can be dual PKIs), job map models, scoring tables, and raw data tables. The customer outcomes region can include a customer type code, job/outcome model tables, scoring tables, and raw data tables.

The ODI repository 206 can also include price sensitivity data tables, which can include jobs and outcomes (note that jobs and outcomes can be implemented as dual PKIs) and fields that include customer IDs.

The ODI repository 206 can also include an ODI translation data region including customer file translation tables, product/service offerings translation tables, sales and marketing campaigns translation tables, innovation concepts translation tables, business development translation tables, and external data translation tables. In a specific implementation, the customer file translation tables include a customer ID to customer type code translation table. In a specific implementation, the product/service offerings translation tables can include job/outcomes as PKIs and cross-references indicating relevance for product/service offerings, company products (subsystems and parts, service programs), competitor products (subsystems, service programs), and pipeline products. In a specific implementation, the sales and marketing campaigns translation tables can include job/outcome as PKIs and cross-references indicative of relevance for sales campaigns and marketing campaigns (company and competitor). In a specific implementation, the innovation concepts translation tables can include job/outcomes as PKIs and cross-references indicative of new product development, R&D roadmap, sales and service concepts, and new marketing positioning and branding concepts. In a specific implementation, the business development translation tables can include job/outcome PKIs and cross references indicative of new M&A targets and new strategic partners. In a specific implementation, the external data translation tables can include job/outcome PKIs and cross-references indicative of patent records, open innovation database records, and trade publication records.

Advantageously, customer needs can be captured as the needs related to a market, goods, and services. A core functional job can have emotional jobs (e.g., personal jobs and social jobs) and other functional jobs (e.g., jobs indirectly related to core job and jobs directly related to core job), each of which can be analyzed using a uniform metric. During a concept innovation phase, a job can be broken down into multiple steps, each step potentially having multiple outcomes associated with it. Desired outcomes are the metrics customers use to measure the successful execution of a job. When the outcomes are known or predicted, the concept innovation stage passes into the devise solution stage, and then a design innovation stage where consumption chain jobs are identified, such as purchase, receive, install, set-up, learn to use, interface, transport, store, maintain, obtain support, upgrade, replace, dispose, to name several. Then it is time to design/support a solution.

Figure 3:
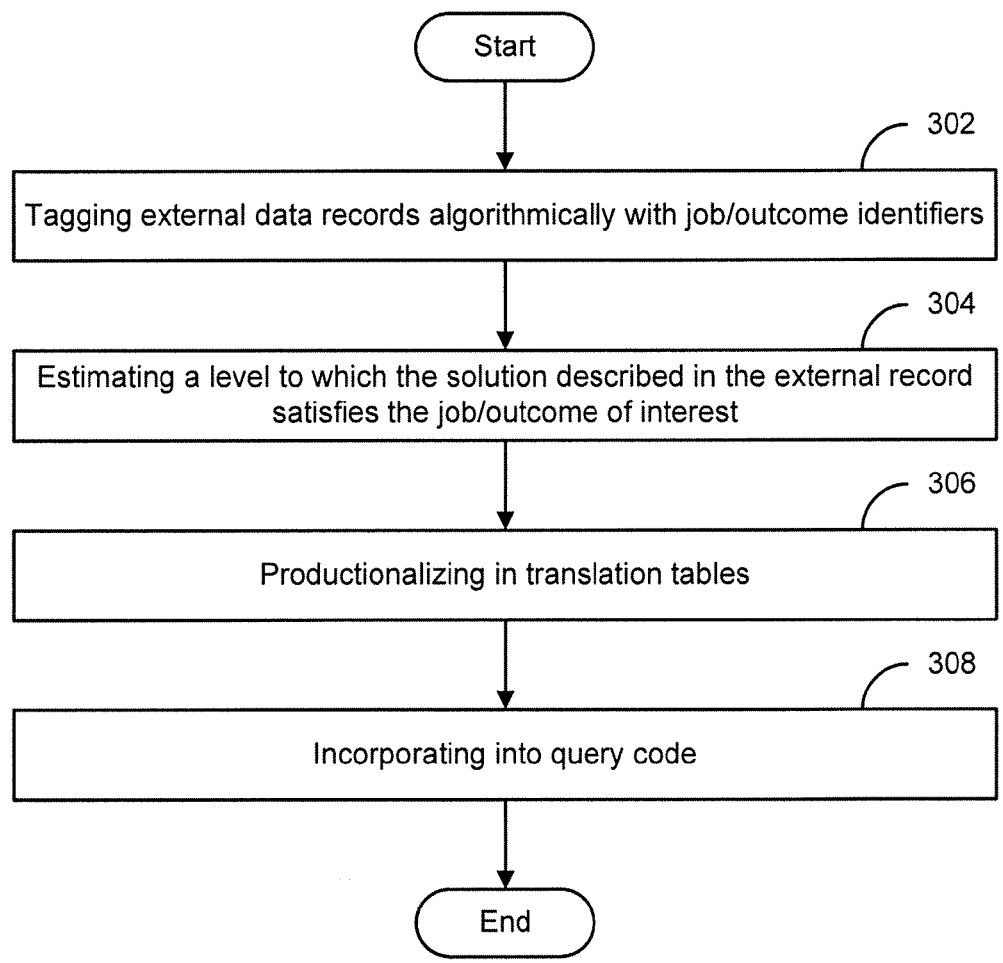
FIG. 3 depicts a flowchart of an example of a method for external data integration.

FIG. 3 depicts a flowchart 300 of an example of a method for external data integration. The benefit of external integration is to normalize disparate enterprise market data from exogenous sources into a job/outcome reference model of ODI. Advantageously, enterprises can cull information from these sources into a consistent and searchable model of the marketplace. This method and other methods are depicted as serially arranged modules. However, modules of the methods may be reordered, or arranged for parallel execution as appropriate.

In the example of FIG. 3, the flowchart 300 starts at module 302 with tagging external data records with job/outcome identifiers using new algorithms that transform data into new data structures, such as the data entities described with reference to FIG. 2. The new algorithms begin with identifying whether a job or outcome of interest relates to a specific field-of-use or solution context, or to a general purpose solution such as a technology used by many systems.

Depending on whether the answer is specific or general, the system assigns an appropriate search strategy embodied within a string of external data sources that can include appropriate solutions. For outcomes associated with specific fields-of-use the search strategy includes specific and highly qualified external data sources which can include, for example, particular patent classification sub classes, trade or academic publications, or other applicable data.

For outcomes associated with general purpose needs the system determines systematically the best sources for new enabling technologies or solutions by automatically identifying and weighting these through a routine like modern textual search. The process continues by searching records found through this method for text strings that include synonymous terms for the objects of control or action from the particular outcome or job of interest. The process completes by recording the existence of this match as a data tag appended to the external data record identifying the outcome/job that was matched and a score value is assigned representing the closeness of this match.

In the example of FIG. 3, the flowchart 300 continues to module 304 with estimating a level to which the solution described in the external record satisfies the job/outcome of interest. The solution can satisfy the job/outcome of interest either objectively or subjectively by manual expert scoring or through available crowd sourcing scores and recording this as coefficients. Crowd sourcing scores might, for example, be derived from patent citations, web page visits, records of the success of the inventor/author in the field of use in general, novel real options based scores of large communities of connected users, or other methods to capture group opinion on the value of solutions to increase satisfaction of the job/outcome of interest.

In the example of FIG. 3, the flowchart 300 continues to module 306 with productionalizing in translation tables.

In the example of FIG. 3, the flowchart 300 continues to module 308 with incorporating into query code. It is likely that queries and reports will be desirable in a system implemented in accordance with one or more of the techniques described in this paper. Such reports may be ad hoc or pre-formed. Ad hoc reports may include solution value added assessments, business case extracts, marketing and sales campaigns needs extracts, or other queries as necessary to provide functionality required or desired to perform uses of a system implemented in accordance with one or more of the techniques described in this paper. Some examples of ad hoc reports are given below:

Solution value added assessment is an ad hoc use having the same general purpose as a needs delivery enhancement strategy report (see, e.g., FIG. 6), but constructed specifically to assess the marketability of a particular solution concept during ideation. It may incorporate a process such as that described with reference to the example of FIG. 3, flowchart 300, module 304.

Business case extracts of the database is an ad hoc use to assess the return on investment (ROI) of particular solutions. The extracts can be used by other reports, or separate business case models to facilitate or improve enterprise investment decision making. The data values extracted include, for example, job/outcome opportunity score, customer data, satisfaction improvement estimates of solutions (see, e.g., FIG. 3), cost and pricing data, and other applicable information.

Marketing and sales campaigns needs extracts are ad hoc reports to assess the market effect of new marketing and sales campaigns based on positioning a product to address unmet needs or otherwise using similar insights to design and assess new marketing and sales campaigns.

Figure 4:
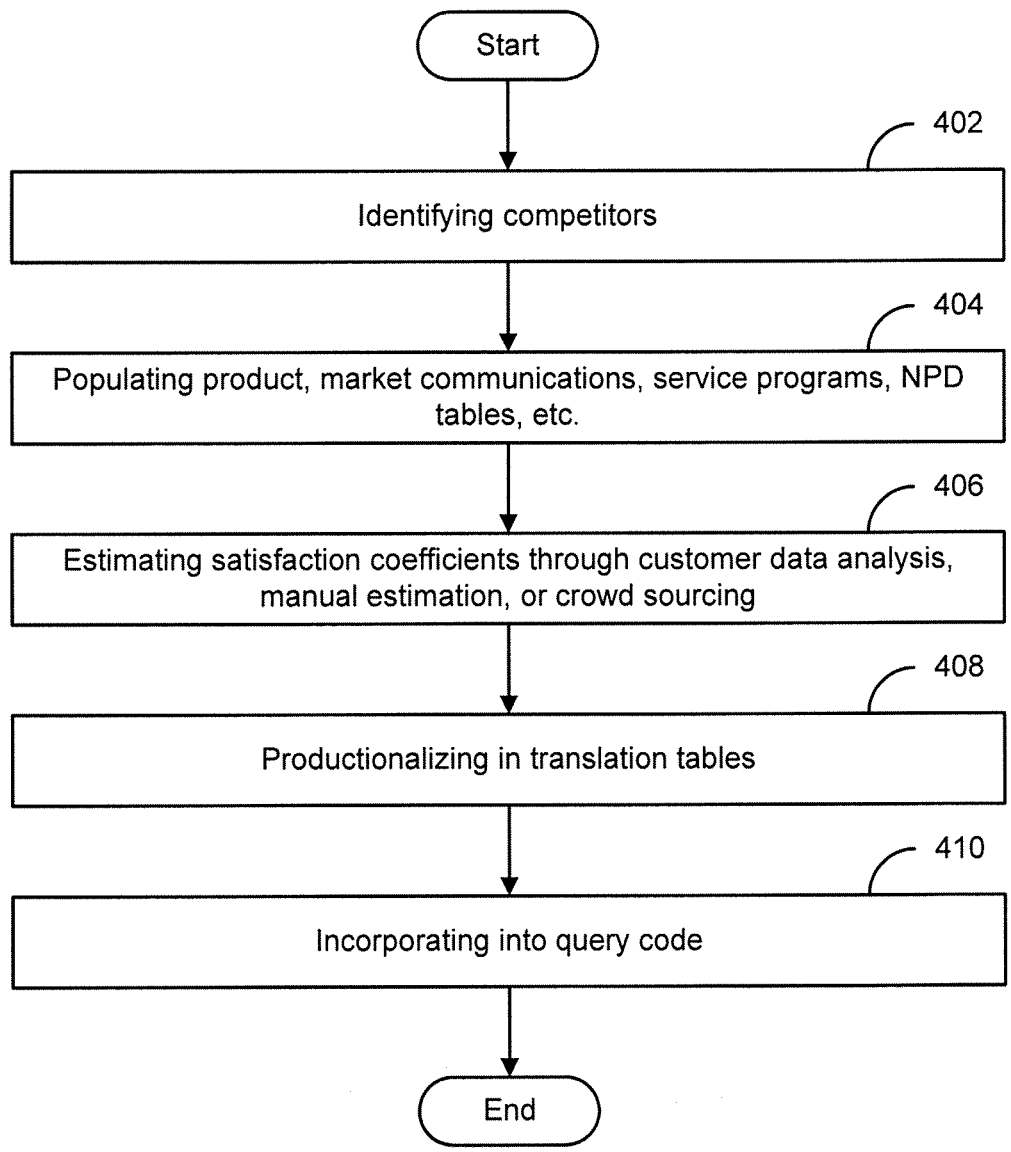
FIG. 4 depicts a flowchart of an example of a competitive assessment method.

FIGS. 4-8 depict examples of pre-formed query methods. FIG. 4 depicts a flowchart 400 of an example of a competitive assessment method. Advantageously, a competitive assessment will enable an enterprise to quantitatively analyze a probable marketplace effectiveness of known customer-facing activities of its competitors, and forecast impacts to its own business plans.

In the example of FIG. 4, the flowchart 400 starts at module 402 with identifying competitors. Competitors can be identified explicitly, found through search, ETL, or the like, or a combination of these. Competitors can also be identified later in the process, for example after a market becomes more defined.

In the example of FIG. 4, the flowchart 400 continues to module 404 with populating product, market communications, service programs, NPD tables, etc.

In the example of FIG. 4, the flowchart 400 continues to module 406 with estimating satisfaction coefficients through customer data analysis, manual estimation, or crowd sourcing and may incorporate a process such as that described with reference to the example of FIG. 3, flowchart 300, module 304.

In the example of FIG. 4, the flowchart 400 continues to module 408 with productionalizing in translation tables.

In the example of FIG. 4, the flowchart 400 continues to module 410 with incorporating into query code.

Figure 5:
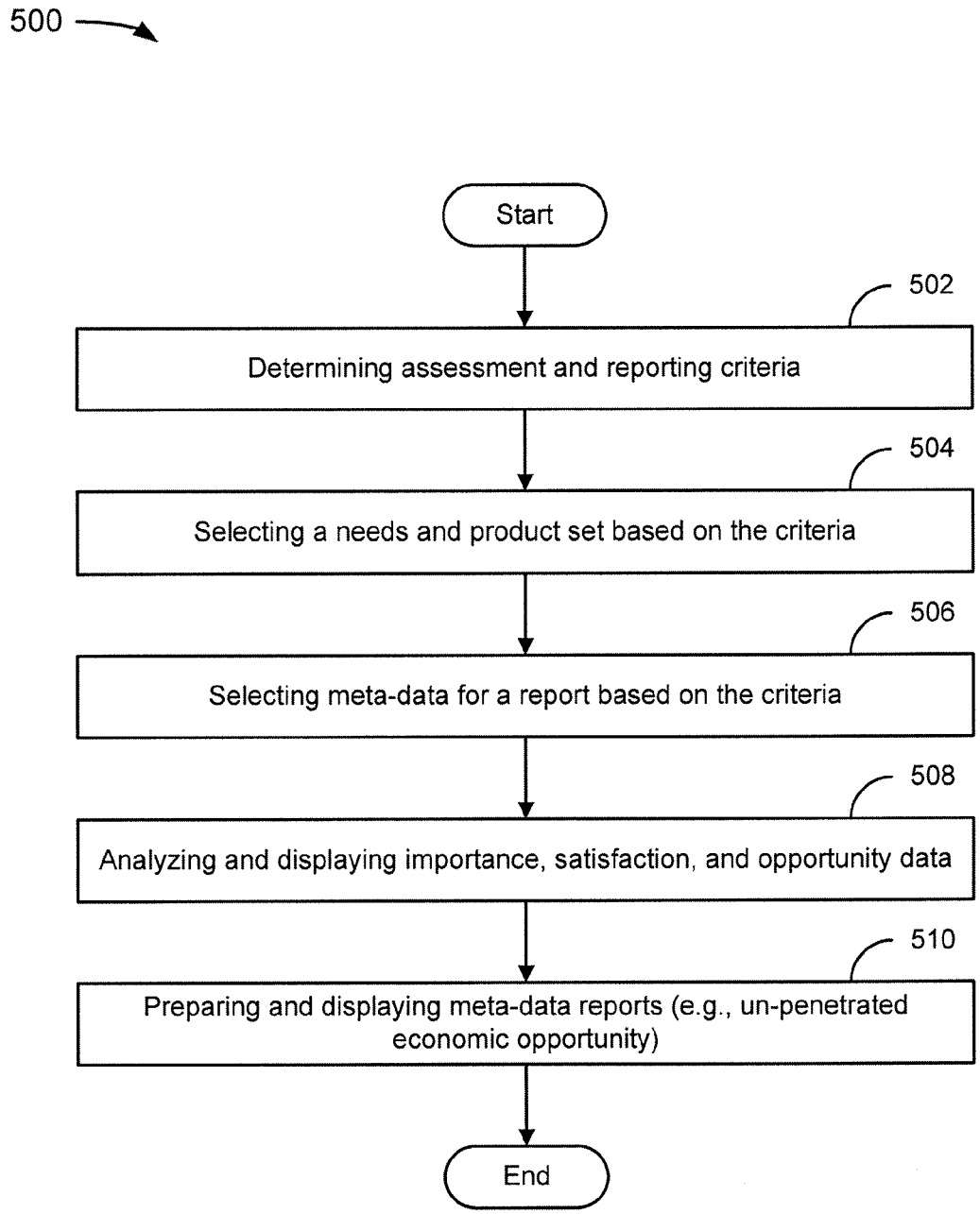
FIG. 5 depicts a flowchart of an example of a needs delivery of current products method.

FIG. 5 depicts a flowchart 500 of an example of a needs delivery of current products method. Advantageously, a needs delivery of current products will provide an enterprise with a flexible reporting engine to assess how well the current state of products are fulfilling the needs of customers across many different referential dimensions (e.g., functional needs, emotional needs, consumption chain needs, platforms, market segments, etc.).

In the example of FIG. 5, the flowchart 500 starts at module 502 with determining assessment and reporting criteria.

In the example of FIG. 5, the flowchart 500 continues to module 504 with selecting a needs and product set based on the criteria.

In the example of FIG. 5, the flowchart 500 continues to module 506 with selecting meta-data for a report based on the criteria.

In the example of FIG. 5, the flowchart 500 continues to module 508 with analyzing and displaying importance, satisfaction, and opportunity data.

In the example of FIG. 5, the flowchart 500 continues to module 510 with preparing and displaying meta-data reports (e.g., un-penetrated economic opportunity).

Figure 6:
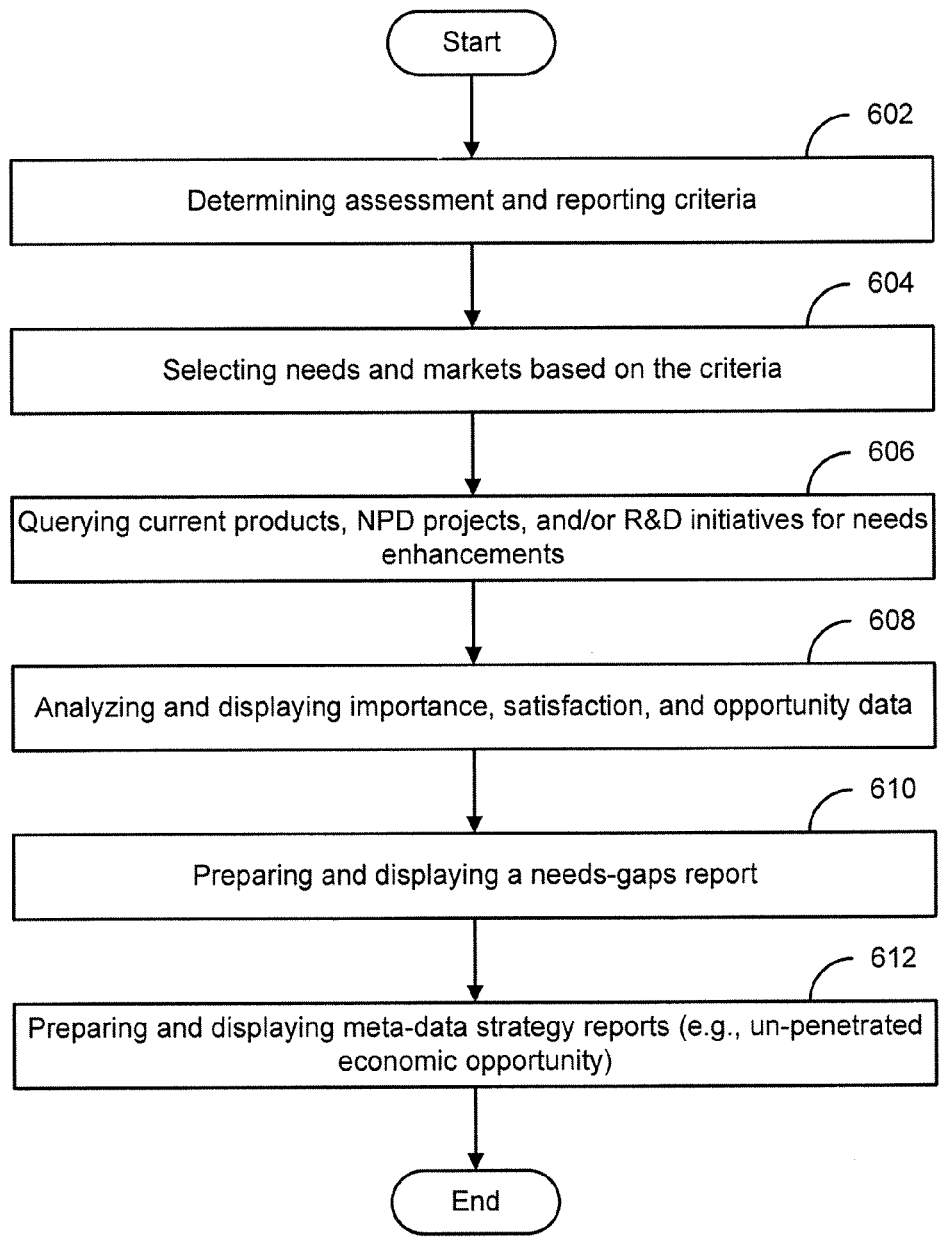
FIG. 6 depicts a flowchart of an example of a needs delivery enhancement strategy method.

FIG. 6 depicts a flowchart 600 of an example of a needs delivery enhancement strategy method. Advantageously, a needs delivery enhancement strategy builds upon the prior use to assess the level of enhancement that pipeline innovations are likely to deliver to the current business portfolio. This may include a product roadmap and R&D.

In the example of FIG. 6, the flowchart 600 starts at module 602 with determining assessment and reporting criteria.

In the example of FIG. 6, the flowchart 600 continues to module 604 with selecting needs and markets based on the criteria.

In the example of FIG. 6, the flowchart 600 continues to module 606 with querying current products, NPD projects, and/or R&D initiatives for needs enhancements.

In the example of FIG. 6, the flowchart 600 continues to module 608 with analyzing and displaying importance, satisfaction, and opportunity data and can incorporate a process such as that described with reference to FIG. 3, flowchart 300, module 304.

In the example of FIG. 6, the flowchart 600 continues to module 610 with preparing and displaying a needs-gaps report.

In the example of FIG. 6, the flowchart 600 continues to module 612 with preparing and displaying meta-data strategy reports (e.g., un-penetrated economic opportunity).

Figure 7:
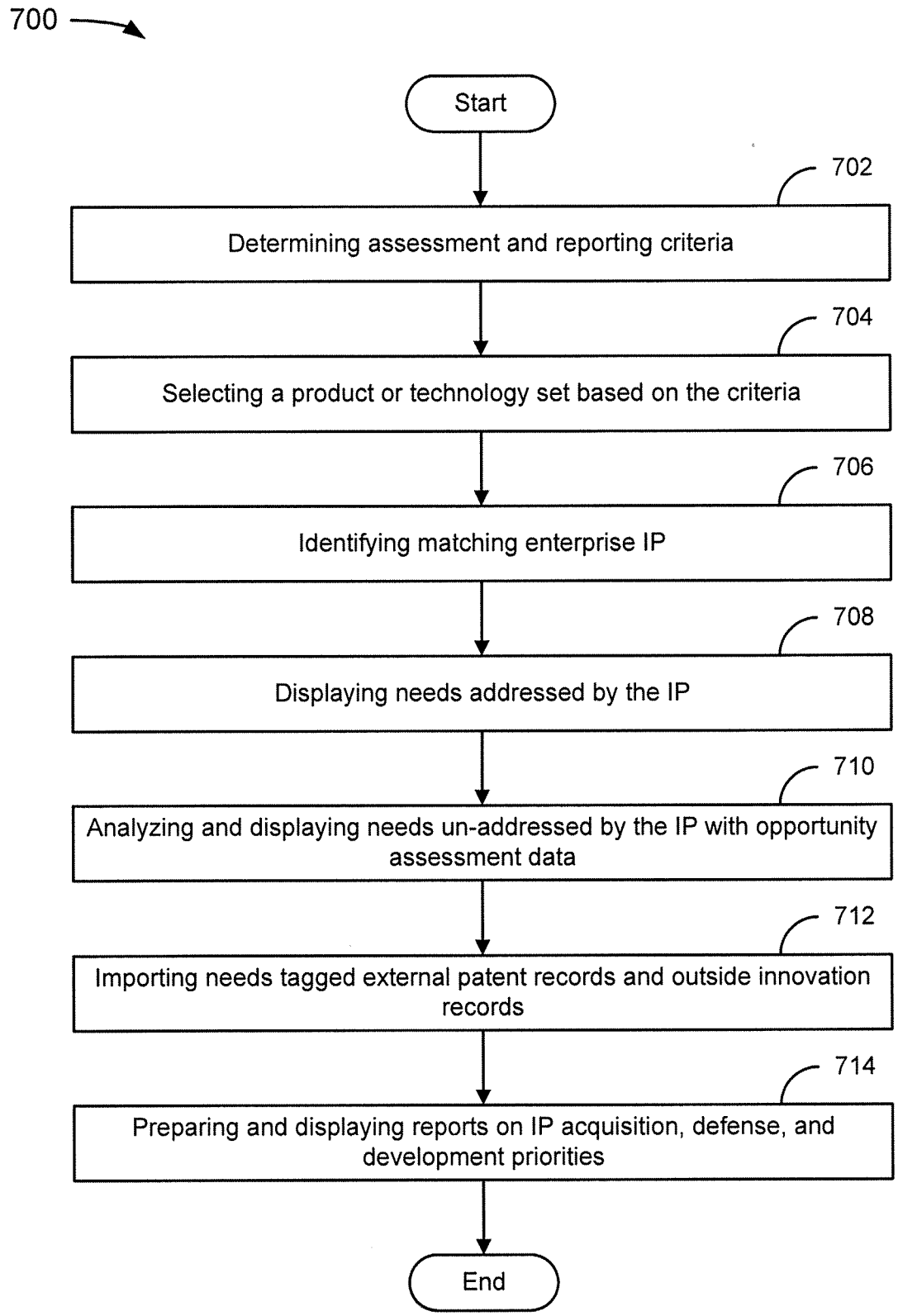
FIG. 7 depicts a flowchart of an example of a needs based IP strategy method.

FIG. 7 depicts a flowchart 700 of an example of a needs based IP strategy method. Advantageously, a needs-based IP strategy can enable an enterprise to efficiently scout internal and external sources of IP, technologies, and other innovation solutions to secure advantages in pursuing strategies to satisfy unmet market needs.

In the example of FIG. 7, the flowchart 700 starts at module 702 with determining assessment and reporting criteria.

In the example of FIG. 7, the flowchart 700 continues to module 704 with selecting a product or technology set based on the criteria.

In the example of FIG. 7, the flowchart 700 continues to module 706 with identifying matching enterprise IP.

In the example of FIG. 7, the flowchart 700 continues to module 708 with displaying needs addressed by the IP.

In the example of FIG. 7, the flowchart 700 continues to module 710 with analyzing and displaying needs un-addressed by the IP with opportunity assessment data.

In the example of FIG. 7, the flowchart 700 continues to module 712 with importing needs tagged external patent records and outside innovation records.

In the example of FIG. 7, the flowchart 700 continues to module 714 with preparing and displaying reports on IP acquisition, defense, and development priorities.

Figure 8:
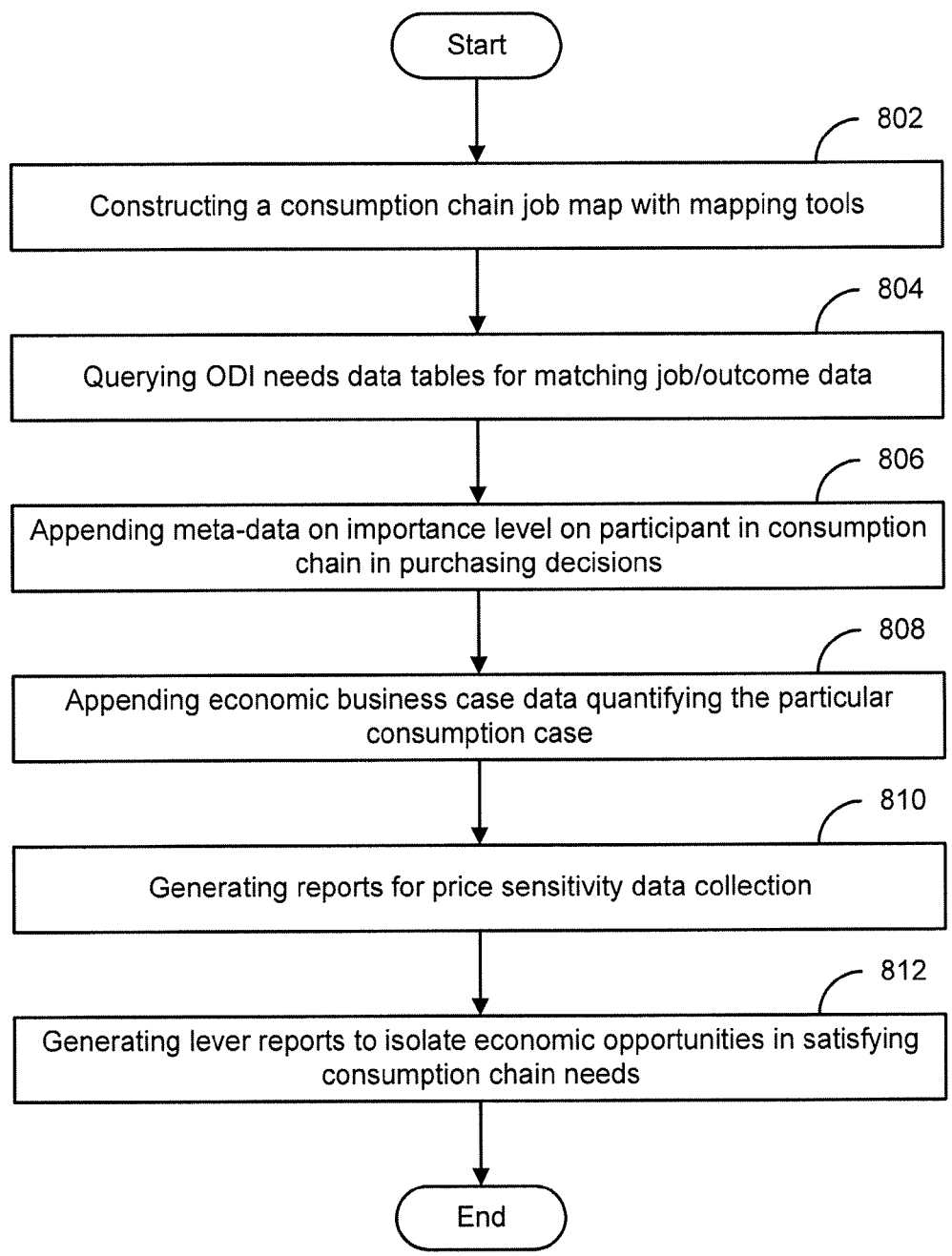
FIG. 8 depicts a flowchart of an example of a consumption chain needs delivery method.

FIG. 8 depicts a flowchart 800 of an example of a consumption chain needs delivery method. Advantageously, a consumption chain needs delivery can enable an enterprise to assess disparate needs and associated importance levels of participants in consumption chains of the enterprise's products in order to optimize investments for sales impact.

In the example of FIG. 8, the flowchart 800 starts at module 802 with constructing a consumption chain job map with mapping tools.

In the example of FIG. 8, the flowchart 800 continues to module 804 with querying ODI needs data tables for matching job/outcome data.

In the example of FIG. 8, the flowchart 800 continues to module 806 with appending meta-data on importance level on participant in consumption chain in purchasing decisions.

In the example of FIG. 8, the flowchart 800 continues to module 808 with appending economic business case data quantifying the particular consumption cases.

In the example of FIG. 8, the flowchart 800 continues to module 810 with generating reports for price sensitivity data collection.

In the example of FIG. 8, the flowchart 800 continues to module 804 with generating lever reports to isolate economic opportunities in satisfying consumption chain needs.

Figure 9:
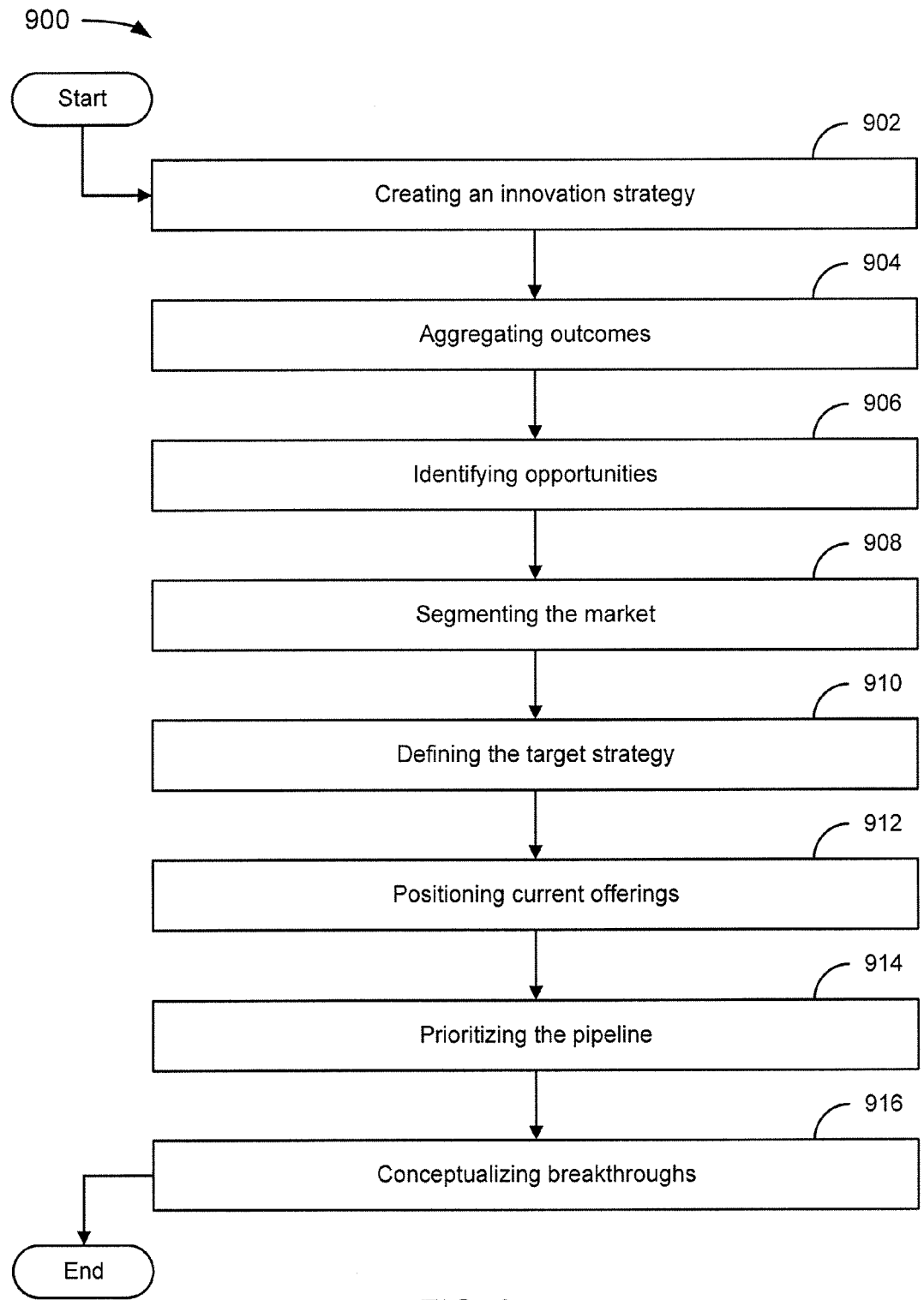
FIG. 9 depicts a flowchart of an example of a method for computationally enabling and enhancing an ODI process.

FIG. 9 depicts a flowchart 900 of an example of a method for computationally enabling and enhancing an ODI process. In the example of FIG. 9, the flowchart 900 starts at module 902 with creating an innovation strategy.

Figure 10:
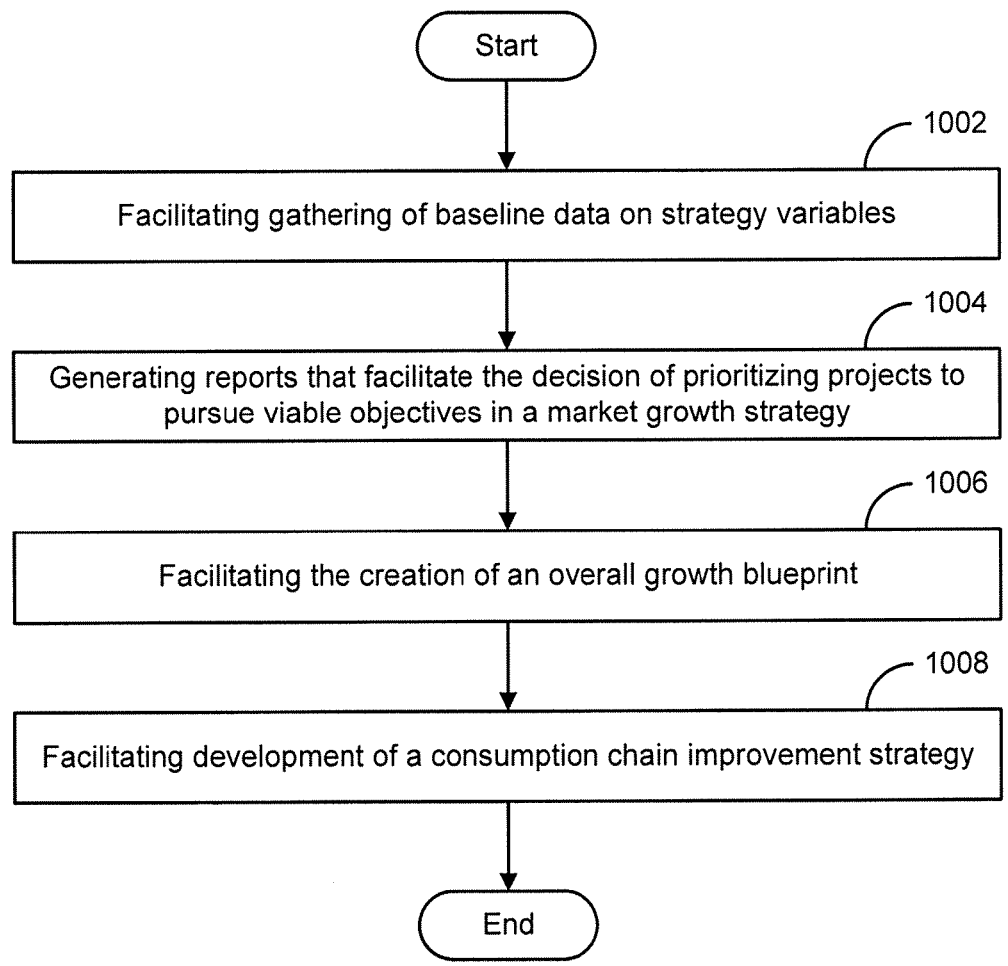
FIG. 10 depicts a flowchart of an example of a method for creating an innovation strategy.

FIG. 10 depicts a flowchart 1000 of an example of a method for creating an innovation strategy. In the example of FIG. 10, the flowchart 1000 starts at module 1002 with facilitating gathering of baseline data on strategy variables. This may include, for example, conducting an inventory of a current strategic roadmap for qualitative impact assessment and/or conducting an inventory of anecdotal data and hypotheses on unmet and over-served needs.

In the example of FIG. 10, the flowchart 1000 continues to module 1004 with generating reports that facilitate the decision of prioritizing projects to pursue viable objectives in a market growth strategy. Five market growth strategies are provided as examples herein, and it should be recognized that at module 1004, reports could be generated to facilitate the decision of prioritizing projects to pursue viable objectives in one or more market growth strategies, with the number depending upon implementation and/or configuration. The examples of market growth strategies are: 1) grow or protect a high-share market, 2) aggressively grow a low-share market the enterprise is already in, 3) enter an attractive market that others are already in, 4) enter a new or emerging high growth market, 5) find a market for a new or emerging technology.

Figure 11:
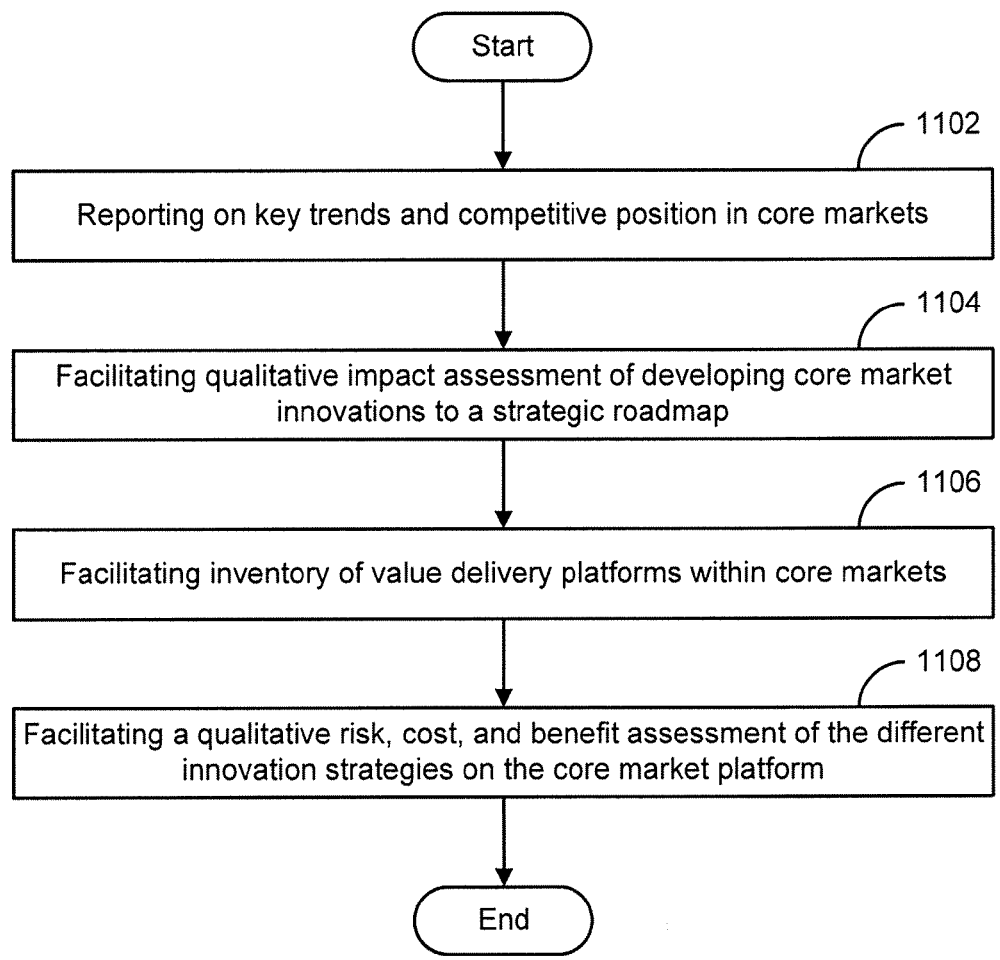
FIGS. 11-15 depict flowcharts of examples of market growth strategy methods.

FIGS. 11-15 depict flowcharts of examples of market growth strategy methods that advantageously use ODI data to assess economic valuation and risks of different market growth strategies. FIG. 11 depicts a flowchart 1100 of an example of a method for growing or protecting a high-share market. In the example of FIG. 11, the flowchart 1100 starts at module 1102 with reporting on key trends and competitive position in core markets. For example, the report can include share, position, response to key trends, strengths, weaknesses, or other applicable information.

In the example of FIG. 11, the flowchart 1100 continues to module 1104 with facilitating qualitative impact assessment of developing core market innovations to a strategic roadmap. For example, the assessment can include how many pipeline products are touched, whether ODI projects will enhance or detract from the pipeline product (and how much), the dollar value of pipeline products touched, the revenue value of pipeline products touched, and other applicable information.

In the example of FIG. 11, the flowchart 1100 continues to module 1106 with facilitating inventory of value delivery platforms within each core market.

In the example of FIG. 11, the flowchart 110 continues to module 1108 with facilitating a qualitative risk, cost, and benefit assessment of the different innovation strategies on the core market platform. For example, the assessment can include platform innovation, business model innovation, features, and other applicable information.

Figure 12:
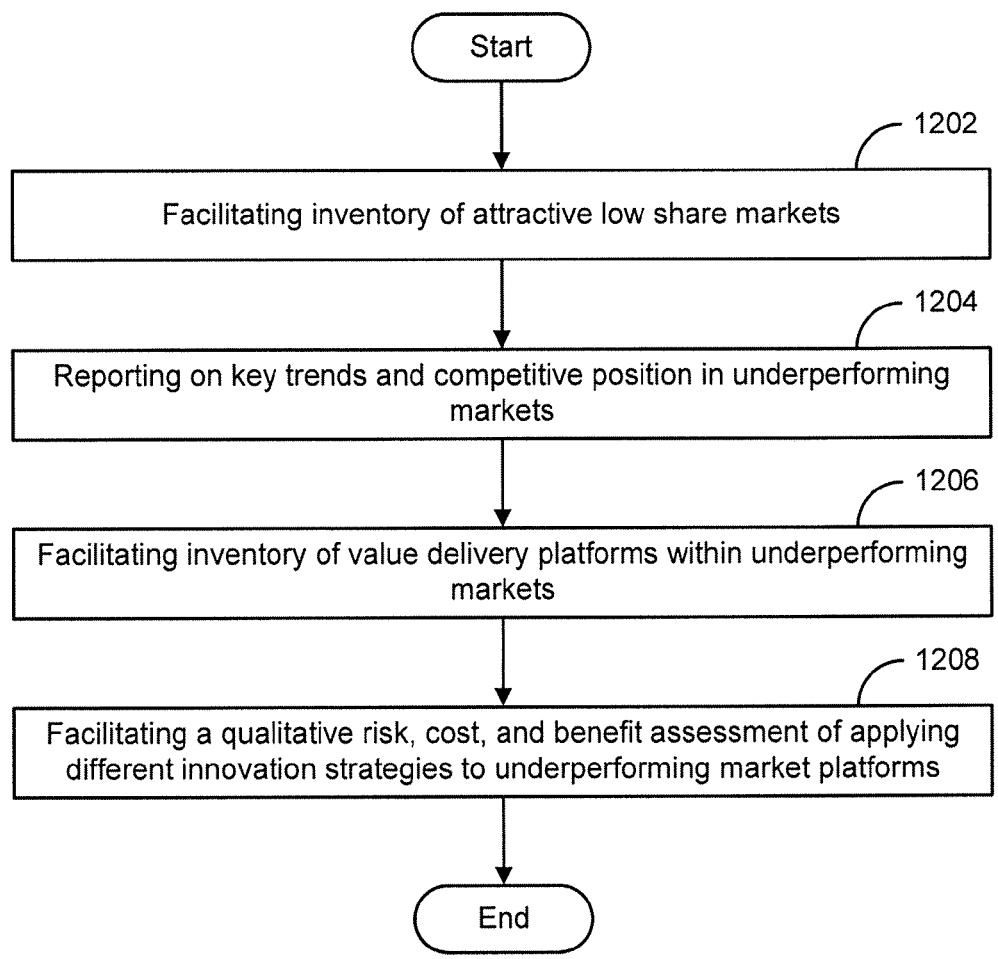

FIG. 12 depicts a flowchart 1200 of an example of a method for aggressively growing a low-share market the enterprise is already in. In the example of FIG. 12, the flowchart 1200 starts at module 1202 with facilitating inventory of attractive low share markets.

In the example of FIG. 12, the flowchart 1200 continues to module 1204 with reporting on key trends and competitive position in underperforming markets. For example, the report can include share, position, response to key trends, strengths, weaknesses, and other applicable information.

In the example of FIG. 12, the flowchart 1200 continues to module 1206 with facilitating inventory of value delivery platforms within underperforming markets.

In the example of FIG. 12, the flowchart 1200 continues to module 1208 with facilitating a qualitative risk, cost, and benefit assessment of applying different innovation strategies to underperforming market platforms. For example, the assessment can include platform innovation, business model innovation, feature development, and other applicable information.

Figure 13:
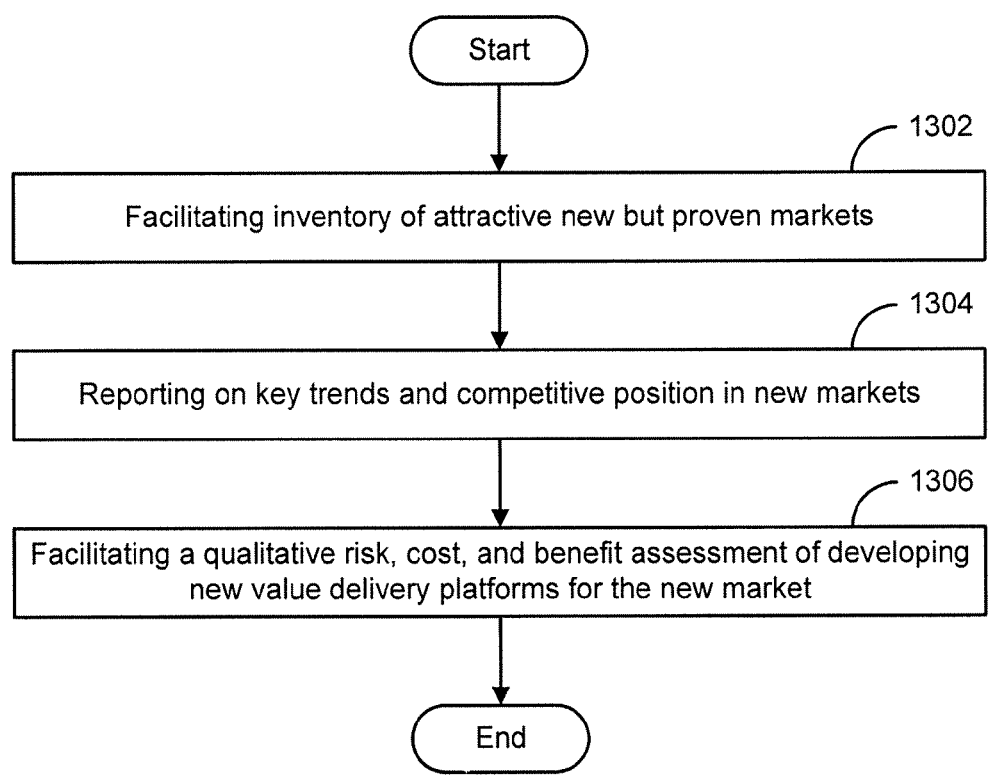

FIG. 13 depicts a flowchart 1300 of an example of a method for entering an attractive market that others are already in. In the example of FIG. 13, the flowchart 1300 starts at module 1302 with facilitating inventory of attractive new but proven markets.

In the example of FIG. 13, the flowchart 1300 continues to module 1304 with reporting on key trends and competitive position in new markets. For example, the report can include share, position, response to key trends, strengths, weaknesses, and other applicable information.

In the example of FIG. 13, the flowchart 1300 continues to module 1306 with facilitating a qualitative risk, cost, and benefit assessment of developing new value delivery platforms for the new market.

Figure 14:
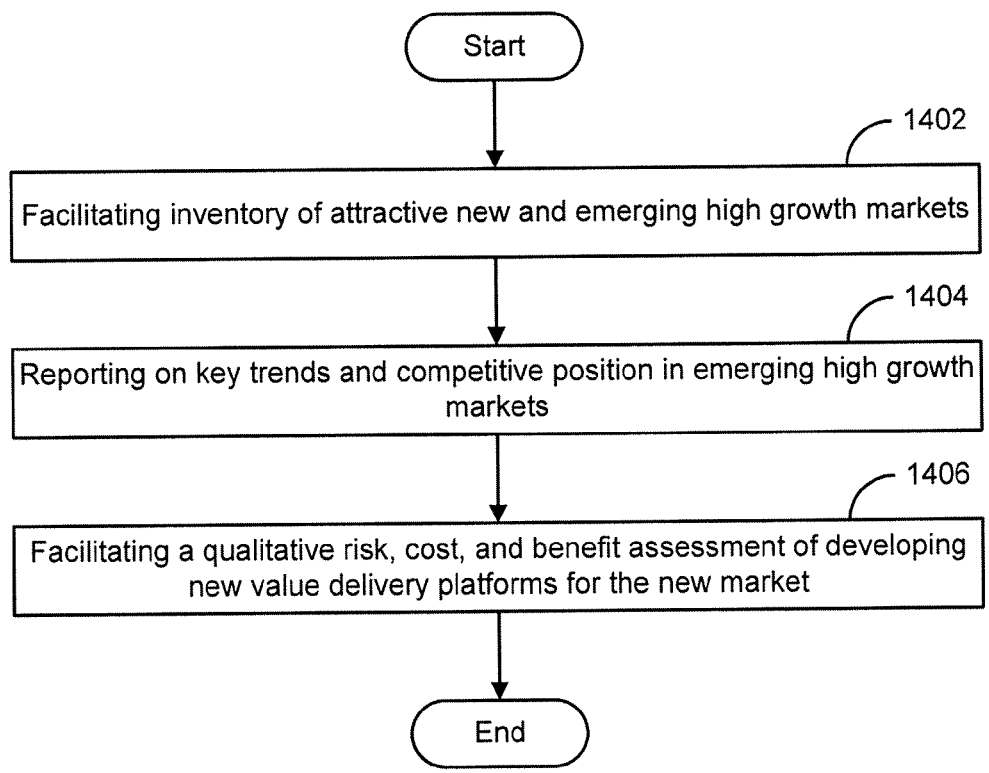

FIG. 14 depicts a flowchart 1400 of an example of a method for entering a new or emerging high growth market. In the example of FIG. 14, the flowchart 1400 starts at module 1402 with facilitating inventory of new and emerging high growth markets.

In the example of FIG. 14, the flowchart 1400 continues to module 1404 with reporting on key trends and competitive position in emerging high growth markets. For example, the report can include share, position, response to key trends, strengths, weaknesses, and other applicable information.

In the example of FIG. 14, the flowchart 1400 continues to module 1406 with facilitating a qualitative risk, cost, and benefit assessment of developing new value delivery platforms for the new market.

Figure 15:
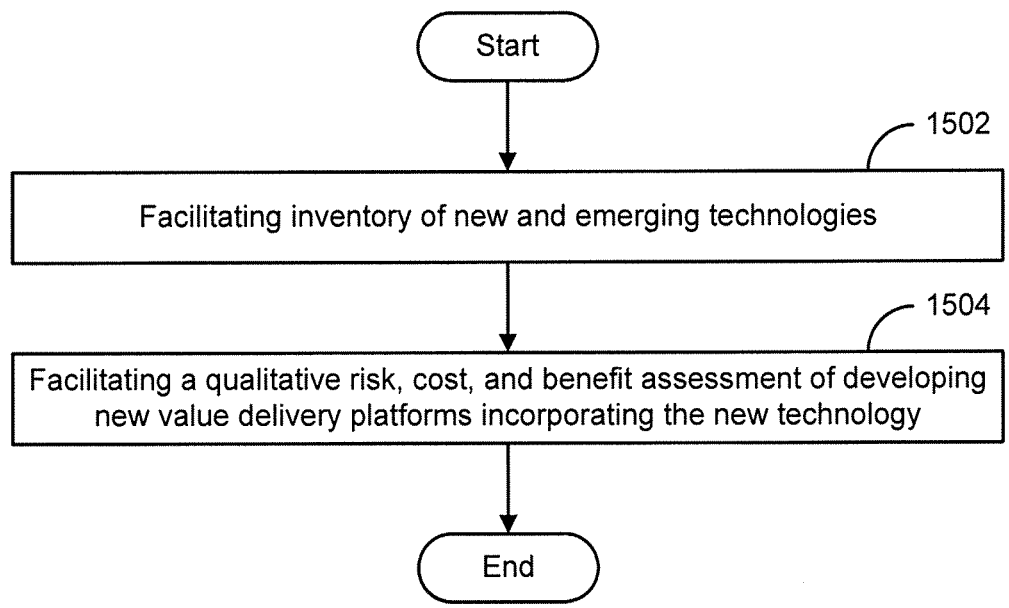

FIG. 15 depicts a flowchart 1500 of an example of a method for finding a market for a new or emerging technology. In the example of FIG. 15, the flowchart 1500 starts at module 1502 with facilitating inventory of new and emerging technologies.

In the example of FIG. 15, the flowchart 1500 continues to module 1504 with facilitating a qualitative risk, cost, and benefit assessment of developing new value delivery platforms incorporating the new technology.

Referring once again to the example of FIG. 10, the flowchart 1000 continues to module 1006 with facilitating the creation of an overall growth blueprint. Advantageously, the growth blueprint can enable the business to orchestrate and prioritize the market growth strategy through the use of the ODI data. If multiple market growth strategies are pursued, multiple growth blueprints may be created. The overall growth blueprint can, in addition, identify or facilitate the identification of particular market growth initiatives in implementing the market growth strategy through the use of the ODI data.

Figure 16:
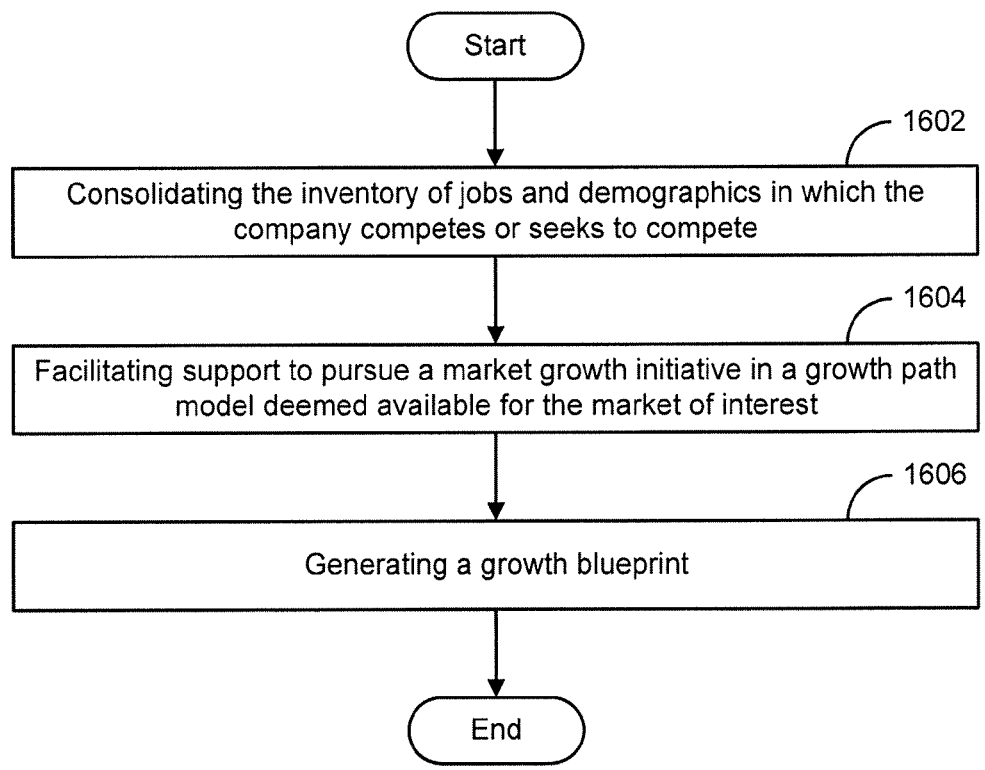
FIG. 16 depicts a flowchart of an example of a method for facilitating the creation of an overall growth blueprint.

FIG. 16 depicts a flowchart 1600 of an example of a method for facilitating the creation of an overall growth blueprint. In the example of FIG. 16, the flowchart 1600 starts at module 1602 with consolidating the inventory of jobs and demographics (the markets) in which the company competes or seeks to compete. The consolidation can include, for example, an evaluation of possible market growth strategies.

In the example of FIG. 16, the flowchart 1600 continues to module 1604 with facilitating support to pursue a market growth initiative in a growth path model deemed available for the market of interest. The support may include, for example, using a growth paths model to facilitate a subjective assessment of the growth blueprint for one or more markets of interest. It may be desirable to evaluate the likelihood of desired outcomes, company-executable actions, and costs to satisfy assumptions, conditions precedent, and management decision criteria that must be present to support pursuing the market growth initiative. This capability can be controlled by user privileges.

In the example of FIG. 16, the flowchart 1600 continues to module 1606 with generating a growth blueprint. The growth blueprint can represent, for example, management's selection of markets of interest, associated market growth initiatives with the presumptive growth paths game plan, and other applicable data. To generate the growth blueprint, it may be desirable to compile actions on plan dependencies that must be taken to satisfy conditions deemed necessary for the success of the game plan. This capability can be controlled by user privileges.

Referring once again to the example of FIG. 10, the flowchart 1000 continues to module 1008 with facilitating the development of a consumption chain improvement strategy.

Figure 17:
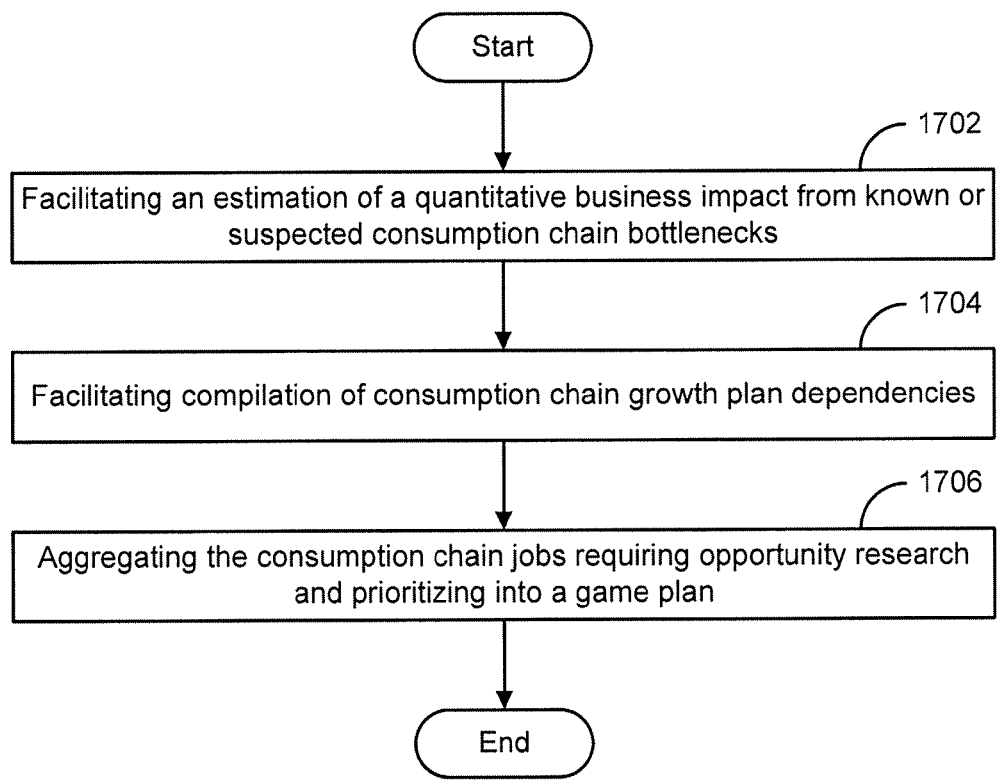
FIG. 17 depicts a flowchart of an example of a method for facilitating the development of a consumption chain improvement strategy.

FIG. 17 depicts a flowchart 1700 of an example of a method for facilitating the development of a consumption chain improvement strategy. In the example of FIG. 17, the flowchart 1700 starts at module 1702 with facilitating an estimation of a quantitative business impact from known or suspected consumption chain bottlenecks. Facilitating the estimation can include facilitating an inventory of known and suspected consumption chain bottlenecks to aid in the estimation. It may also be desirable to sort priority bottlenecks into the consumption chain jobs of, for example: purchase, receive, install, set-up, learn to use, interface, transport, store, maintain, dispose, or some other applicable category.

In the example of FIG. 17, the flowchart 1700 continues to module 1704 with facilitating compilation of consumption chain growth plan dependencies. The consumption chain growth plan dependencies can be compiled automatically or by an expert user, depending upon implementation and/or preference. Automated features can search growth plan dependencies for terms that match or are associated with the consumption chain jobs of, for example: purchase, receive, install, set-up, learn to use, interface, transport, store, maintain, dispose, or some other applicable category.

In the example of FIG. 17, the flowchart 1700 continues to module 1706 with aggregating the consumption chain jobs requiring opportunity research and prioritizing into a game plan.

Referring once again to the example of FIG. 9, the flowchart 900 continues to module 904 with aggregating outcomes. Aggregating outcomes can include facilitating qualitative research (FIG. 18) or quantitative research (FIG. 19).

Figure 18:
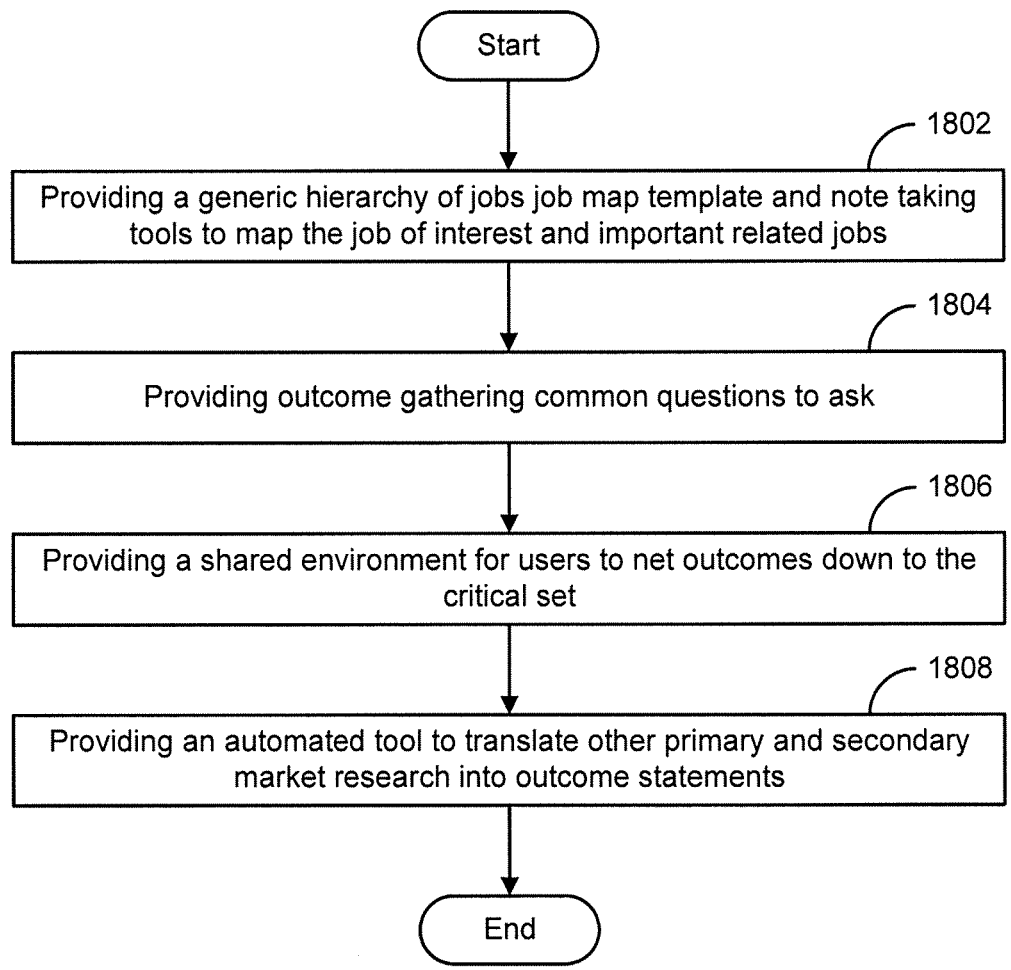
FIG. 18 depicts a flowchart of an example of a method for facilitating qualitative research.
Figure 19:
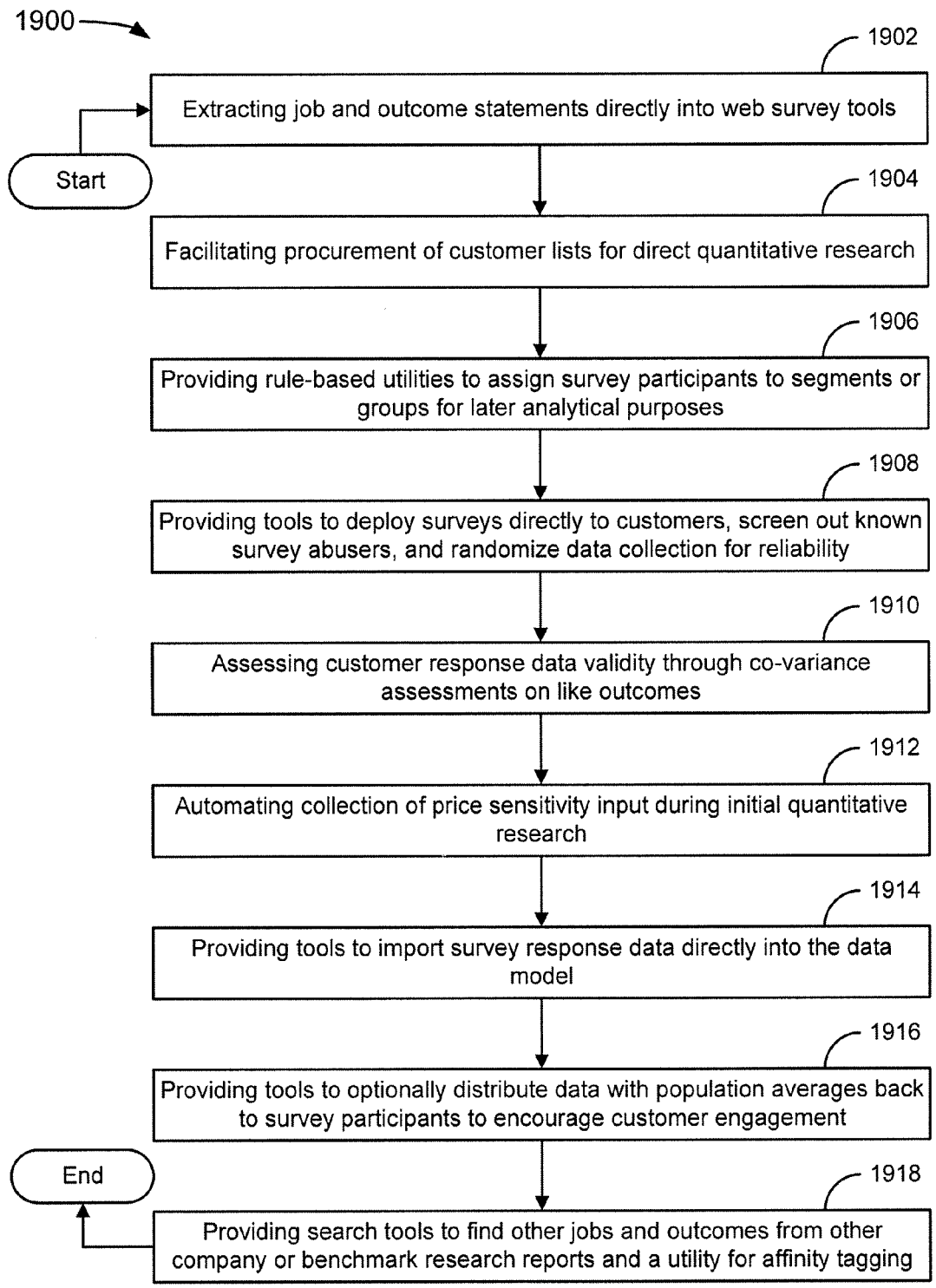
FIG. 19 depicts a flowchart of an example of a method for facilitating quantitative research.

FIG. 18 depicts a flowchart 1800 of an example of a method for facilitating qualitative research. In the example of FIG. 18, the flowchart 1800 starts at module 1802 with providing a generic hierarchy of jobs job map template and note taking tools to map the job of interest and important related jobs.

In the example of FIG. 18, the flowchart 1800 continues to module 1804 with providing outcome gathering common questions to ask.

In the example of FIG. 18, the flowchart 1800 continues to module 1806 with providing a shared environment for users to net outcomes down to the critical set. This capability can be controlled by user privileges.

In the example of FIG. 18, the flowchart 1800 continues to module 1808 with providing an automated tool to translate other primary and secondary market research into outcome statements.

FIG. 19 depicts a flowchart 1900 of an example of a method for facilitating quantitative research. In the example of FIG. 19, the flowchart 1900 starts at module 1902 with extracting job and outcome statements directly into web survey tools.

In the example of FIG. 19, the flowchart 1900 continues to module 1904 with facilitating procurement of customer lists for direct quantitative research. This capability can be controlled by user privileges.

In the example of FIG. 19, the flowchart 1900 continues to module 1906 with providing rule-based utilities to assign survey participants to segments or groups for later analytical purposes. It may be desirable to provide tools and utilities to tag survey participants with screening and segmentation factors. This capability can be controlled by user privileges.

In the example of FIG. 19, the flowchart 1900 continues to module 1908 with providing tools to deploy surveys directly to customers, screen out known survey abusers, and randomize data collection for reliability. This capability can be controlled by user privileges.

In the example of FIG. 19, the flowchart 1900 continues to module 1910 with assessing customer response data validity through co-variance assessments on like outcomes.

In the example of FIG. 19, the flowchart 1900 continues to module 1912 with automating collection of price sensitivity input during initial quantitative research.

In the example of FIG. 19, the flowchart 1900 continues to module 1914 with providing tools to import survey response data directly into the data model. This capability can be controlled by user privileges.

In the example of FIG. 19, the flowchart 1900 continues to module 1916 with providing tools to optionally distribute data with population averages back to survey participants to encourage customer engagement. These tools, while useful, are optional.

In the example of FIG. 19, the flowchart 1900 continues to module 1918 with providing search tools to find other jobs and outcomes from other company or benchmark research reports and a utility for affinity-tagging. The search tools can be automated. The benchmark research reports can be Strategyn™ benchmark research reports. The affinity-tagging can be used to record associations and facilitate insights and inferences between related factors of separate studies. This capability can be controlled by user privileges.

Referring once again to the example of FIG. 9, the flowchart 900 continues to module 906 with identifying opportunities.

Figure 20:
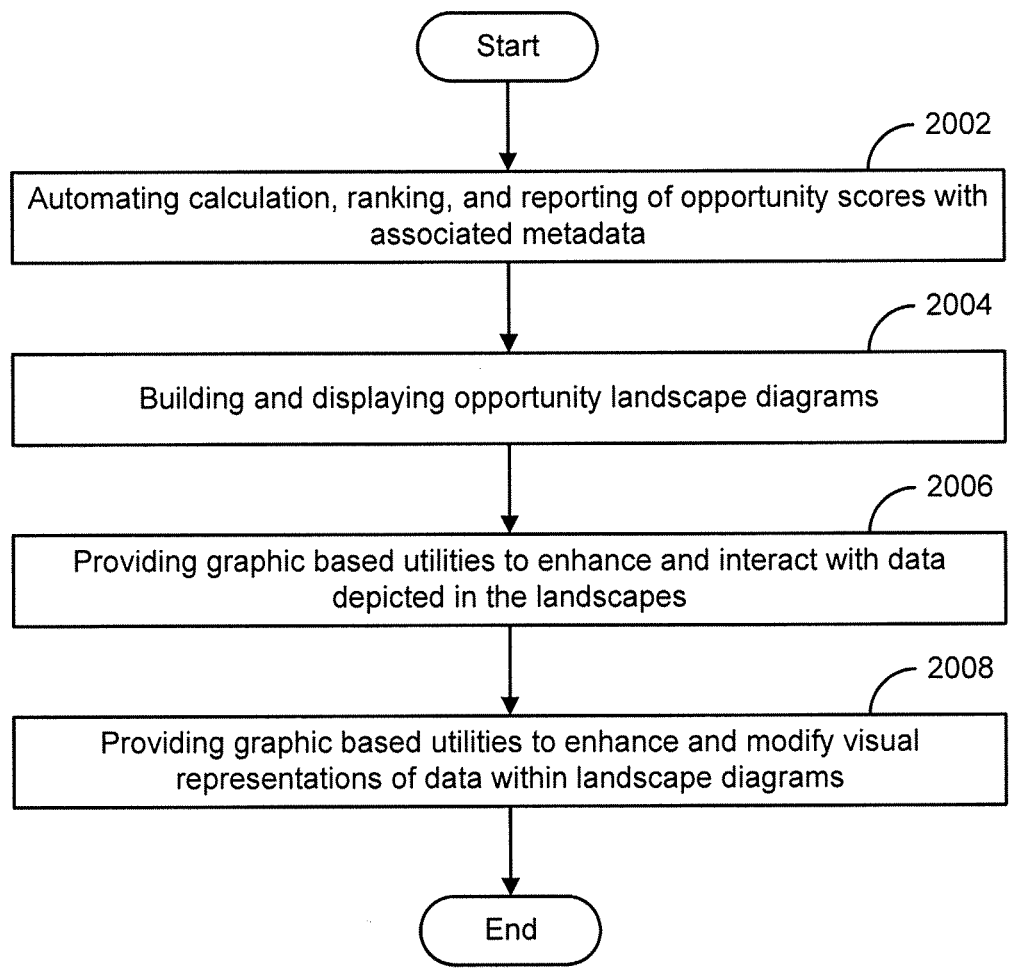
FIG. 20 depicts a flowchart of an example of a method for identifying opportunities.

FIG. 20 depicts a flowchart 2000 of an example of a method for identifying opportunities. In the example of FIG. 20, the flowchart 2000 starts at module 2002 with automating calculation, ranking, and reporting of opportunity scores with associated metadata. It may be desirable to provide report design tools to customize query logic used to build reports.

In the example of FIG. 20, the flowchart 2000 continues to module 2004 with building and displaying opportunity landscape diagrams.

In the example of FIG. 20, the flowchart 2000 continues to module 2006 with providing graphic based utilities to enhance and interact with data depicted in the landscapes. This can facilitate identifying, for example, affinities and correlation factors with other data points in the landscape, particular solution concepts, market growth strategies, market growth paths, dependencies/insights on assumptions, conditions precedent, decision criteria related to management investment decisions, and other applicable information.

In the example of FIG. 20, the flowchart 2000 continues to module 2008 with providing graphic based utilities to enhance and modify visual representations of data within landscape diagrams. This can enable a user to accentuate, for example, relationships, properties of data points, or other insights. Other capabilities of the utilities can include enabling visualization of economic opportunity from satisfying unmet needs and integration of statistical modeling methods to a project. This capability can be controlled by user privileges.

Referring once again to the example of FIG. 9, the flowchart 900 continues to module 908 with segmenting the market.

Figure 21:
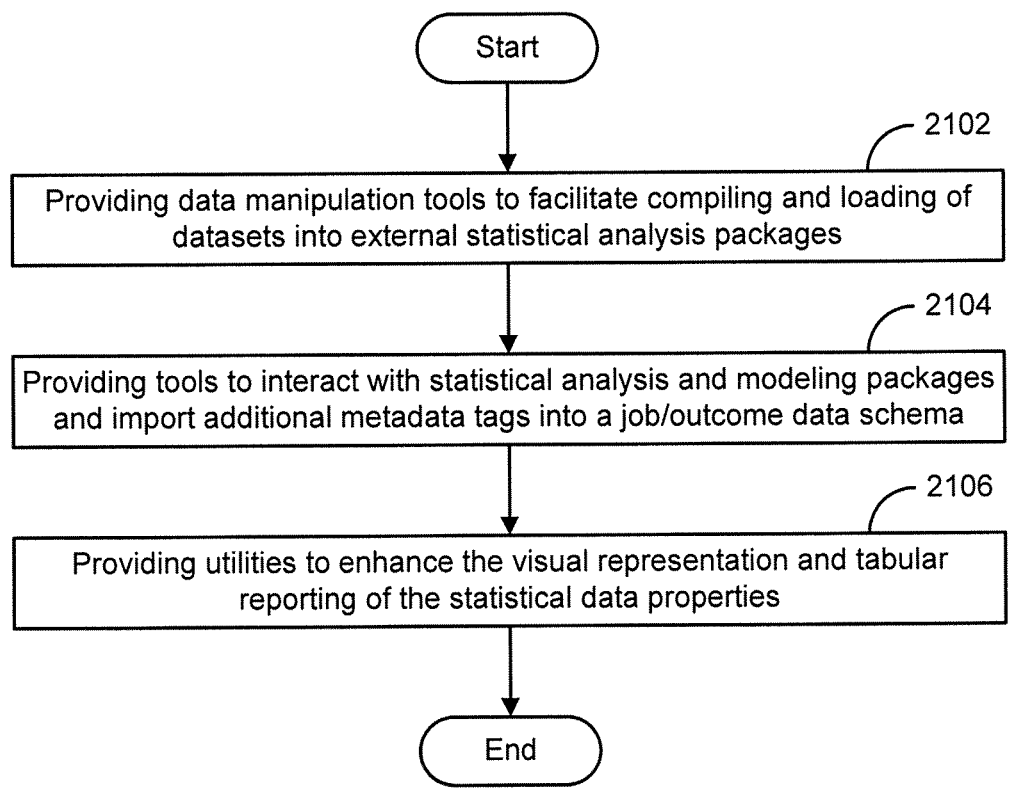
FIG. 21 depicts a flowchart of an example of a method for segmenting the market.

FIG. 21 depicts a flowchart 2100 of an example of a method for segmenting the market. In the example of FIG. 21, the flowchart 2100 starts at module 2102 with providing data manipulation tools to facilitate compiling and loading of datasets into external statistical analysis packages.

In the example of FIG. 21, the flowchart 2100 continues to module 2104 with providing tools to interact with statistical analysis and modeling packages and import additional metadata tags into a job/outcome data schema. The metadata tags may include, for example, cluster affinity scores. This capability can be controlled by user privileges.

In the example of FIG. 21, the flowchart 2100 continues to module 2106 with providing utilities to enhance the visual representation and tabular reporting of the statistical data properties.

Referring once again to the example of FIG. 9, the flowchart 900 continues to module 910 with defining the targeting strategy.

Figure 22:
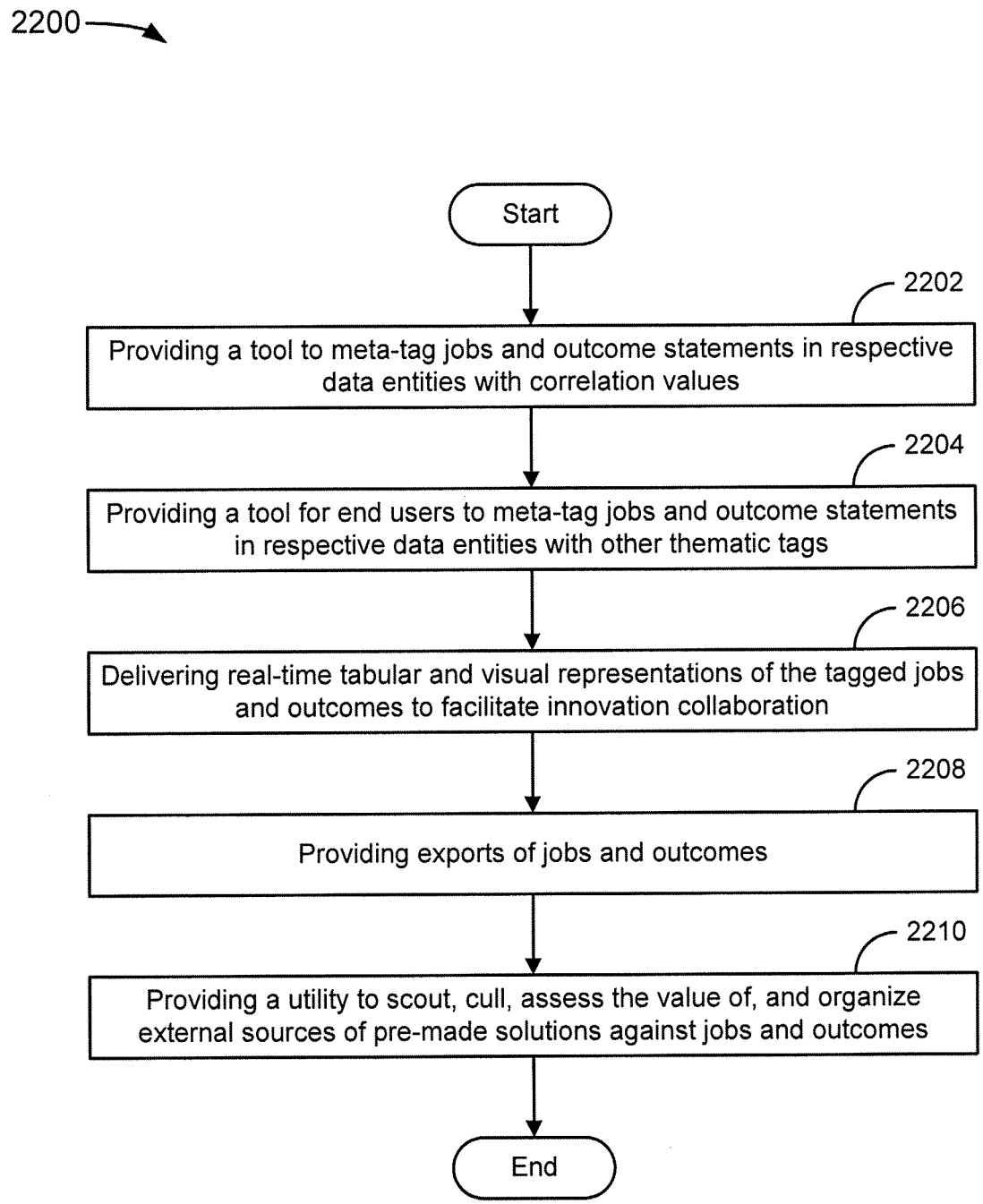
FIG. 22 depicts a flowchart of an example of a method for defining the targeting strategy.

FIG. 22 depicts a flowchart 2200 of an example of a method for defining the targeting strategy. In the example of FIG. 22, the flowchart 2200 starts at module 2202 with providing a tool to meta-tag jobs and outcome statements in respective data entities with correlation values. The correlation values are useful to assess alignment of current and future solutions with opportunities of interest. This capability can be controlled by user privileges.

In the example of FIG. 22, the flowchart 2200 continues to module 2204 with providing a tool for end users to meta-tag jobs and outcome statements in respective data entities with other thematic tags. The thematic tags are useful to facilitate collaborative ideation and business case development. This capability can be controlled by user privileges.

In the example of FIG. 22, the flowchart 2200 continues to module 2206 with delivering real-time tabular and visual representations of the tagged jobs and outcomes to facilitate innovation collaboration.

In the example of FIG. 22, the flowchart 2200 continues to module 2208 with providing exports of jobs and outcomes. The exports can be useful to facilitate external solution sourcing and imports of respondent solutions into the data entities supporting reporting. This capability can be controlled by user privileges.

In the example of FIG. 22, the flowchart 2200 continues to module 2210 with providing a utility to scout, cull, assess the value of, and organize external sources of pre-made solutions against jobs and outcomes. The jobs and outcomes can include, for example, new technologies and inventions.

In the example of FIG. 9, the flowchart 900 continues to module 912 with positioning current offerings. This can be automated using capabilities described above with reference to one or more of modules 902-910.

In the example of FIG. 9, the flowchart 900 continues to module 914 with prioritizing the pipeline. Prioritizing the pipeline can include providing a tool set to automate prioritization of a business' new product development, R&D, and business development by leveraging the capability. This may involve a process similar to that described above with reference to FIG. 6.

In the example of FIG. 9, the flowchart 900 continues to module 916 with conceptualizing breakthroughs.

Figure 23:
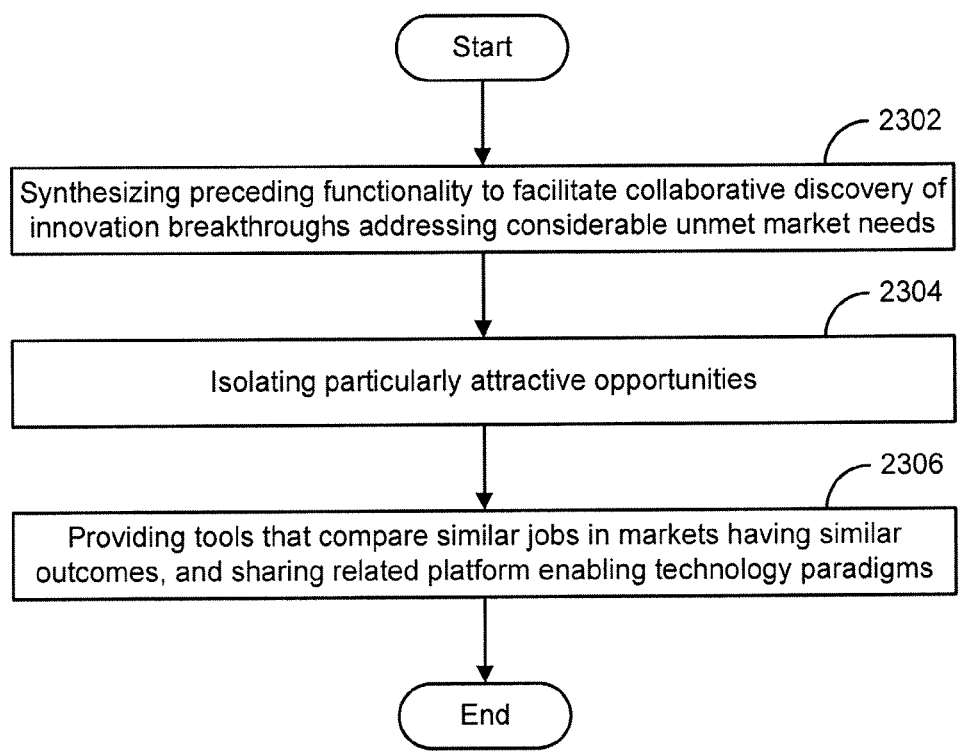
FIG. 23 depicts a flowchart of an example of a method for conceptualizing breakthroughs.

FIG. 23 depicts a flowchart 2300 of an example of a method for conceptualizing breakthroughs. In the example of FIG. 23, the flowchart 2300 starts at module 2302 with synthesizing the preceding functionality of FIGS. 20-22 to facilitate collaborative discovery of innovation breakthroughs addressing considerable unmet market needs.

In the example of FIG. 23, the flowchart 2300 continues to module 2304 with isolating particularly attractive opportunities. Opportunities can be attractive, for example, to disrupt current platforms with new platforms or technologies having advantages in cost over current platforms yet delivering satisfaction along outcomes and jobs that are balanced with importance.

In the example of FIG. 23, the flowchart 2300 continues to module 2306 with providing tools that compare similar jobs in markets having similar outcomes, and sharing related platform-enabling-technology-paradigms. The tools can look across similar jobs in markets using either internal or external sources. The same or related platform-enabling-technology-paradigms might include, for example, technologies that are associated with electronic storage media. This tool is useful to postulate technology redeployment strategies and chart potential pathways of technology-based disruption and new platform breakthroughs.

Figure 24:
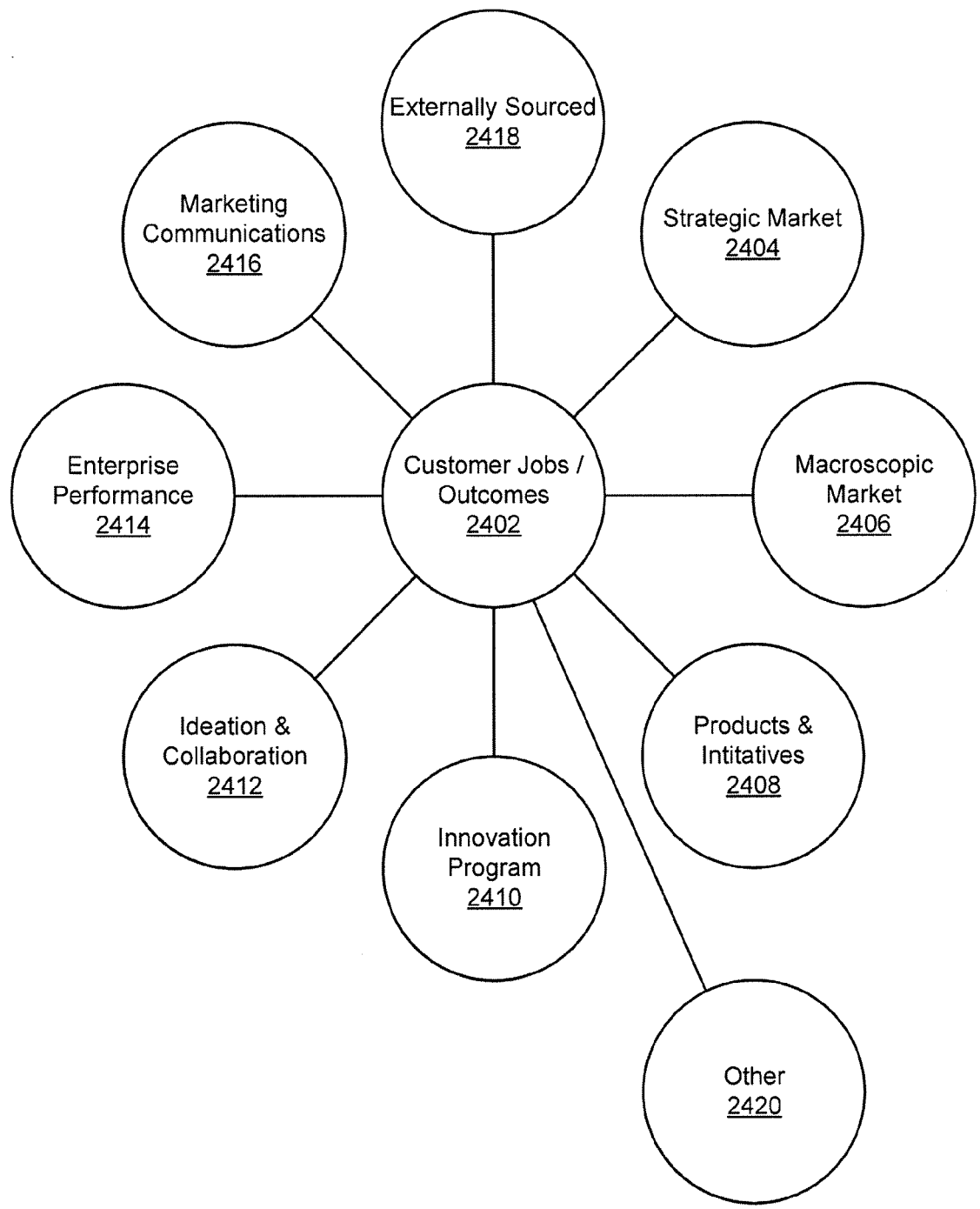
FIG. 24 depicts a conceptual diagram of an example of a data structure having data entities.

FIG. 24 depicts a conceptual diagram 2400 of an example of a data structure that could be used with a USIMS having data entities interconnected, and normalized by an Outcome Driven reference model. Data and information included within the data structure is defined as "data entities." In the example of FIG. 24, the diagram 2400 includes a customer jobs/outcomes data entity 2402, a strategic market data entity 2404, a macroscopic market data entity 2406, a products data entity 2408, an innovation management data entity 2410, a research and development (R&D) data entity 2412, a sales entity 2414, a marketing communications data entity 2416, and a financial data entity 2418. It should be noted that these data entities are intended to serve as examples; there may be more or fewer data entities. When reference is made to a data entity that is not depicted in the example of FIG. 24, the data entity is referred to as an other data entity 2420.

The diagram 2400 illustrates, by way of example but not limitation, a "star schema," though some other applicable data schema could be implemented in a computer-readable medium. Since relational databases are more common and less expensive to implement than multi-dimensional databases, it may be desirable to implement multi-dimensional data in a relational database. The star schema is one way to implement multi-dimensional data in a relational database. Another reason to use a star schema is that queries are relatively simple because only joins and conditions involve a fact table and a single level of dimension tables.

A star schema is a data warehouse schema that typically includes one or more fact tables and any number of dimension tables. (An example implementation is illustrated in FIGS. 26A to 26F.) The fact tables hold data and dimension tables describe each value of a dimension and can be joined to fact tables if desired. Typically, dimension tables have a simple primary key, while fact tables have a compound primary key comprising the aggregate of relevant dimension keys.

In the example of FIG. 24, at the "hub" of the diagram 2400 is customer jobs/outcomes data entity 2402. The customer jobs/outcomes data entity 2402 includes referential data pertaining to jobs and outcomes that the rest of a system implementing the techniques described in this paper can invoke. For example, the customer jobs/outcomes data entity 2402 can include scored results of ODI based market studies used in conducting business impact analyses. The customer jobs/outcomes data entity 2402, and other data entities described in this paper, can include data regions, which are partitioned data areas (whether physical or through electronic means) of an information system containing like types or classes of data; data domains, which are data regions that share a particular relationship and information design; data tables, which are structured data entities containing actual data that have data fields for searching and are populated with data records; ODI translation tables where each applicable data region is cross-referenced to, e.g., customer jobs and outcomes through coefficients of estimated or measured satisfaction levels; and other data structures that are sufficiently different from the others so as to warrant their own class, such as may be the case for machine code, and that are deemed necessary or desirable in implementing a system in accordance with the techniques described in this paper.

The customer jobs/outcomes data entity 2402 facilitates the indexing, storage, retrieval, and analysis functions of a system implementing the data structure. The outcome driven reference model that normalizes a USMIS can be manifested in the Customer Jobs and Outcomes 2402. Some examples of portions of the customer jobs/outcomes data entity 2402 include: a customer profile region, a customer jobs region, a customer outcomes region, price sensitivity data tables, an ODI translation data region. It may be noted that these portions of the customer jobs/outcomes data entity 2402 could themselves be referred to as data entities (in accordance with the definition provided previously for the term "data entity") or data sub-entities. The customer profile region can include, for example, attributes such as customer ID, customer demographic attributes, products the customer uses, the role of the customer in a job and in a customer value chain, membership in segments as defined by the outcome driven needs analysis process and attitudes, and/or other applicable data sub-entities. The customer jobs region can include, for example, attributes such as customer ID, customer type, data including job map models and raw or scored data from ODI studies, and/or other applicable data sub-entities. The customer outcomes region can include, for example, attributes such as customer ID, customer type, data including job referenced outcome statements and raw or scored data from ODI studies, and other applicable data sub-entities. The price sensitivity region may include, for example, attributes such as customer ID, customer type, data including job or outcome statement referenced willingness-to-pay data from ODI studies, and/or other applicable sub-entities. The ODI translation region may include, for example, reference tables to relate customers into customer types or segments, relate products of the company, its competitors, and its pipeline of new product and other innovation or business developments into jobs and outcomes, relate the relevance of sales and marketing campaigns of the company and its competitors to jobs and outcomes, and relate records in external data bases such as may pertain to patents and new technologies, to jobs and outcomes, and/or to enable other applicable tasks.

The strategic market data entity 2404 includes market data pertaining to specific markets. For example, the strategic market data entity 2404 can include a competitors data region, a new and adjacent markets data region, a business development data region (e.g., M&A landscape, partners, etc.), or other applicable data sub-entities.

The macroscopic market data entity 2406 includes macroscopic data pertaining to overall market size and composition. For example, the macroscopic market data entity 2406 can include a market segments data region, a market demographics data region, a monetary market sizing data region, a customer data region (including, e.g., a product ownership table, an acquisition campaign table, a satisfaction survey table, etc.), or other applicable data sub-entities.

The products data entity 2408 includes data pertaining to products of competitors and, assuming the system is implemented at a company with products, the company. For example, the products data entity 2408 can include product tables, an NPD data region (e.g., needs delivery concept testing impact studies, new product solution tables, etc.), or other applicable data sub-entities.

The innovation management data entity 2410 includes data pertaining to ideation and collaboration. For example, the innovation management data entity 2410 can include an idea table, needs delivery export/import tables for intra- and extra-enterprise collaboration, or other applicable data sub-entities.

The R&D data entity 2412 includes data pertaining to projects and initiatives. For example, the R&D data entity 2412 can include a project pipeline data region, an emerging technologies data region, or other applicable data sub-entities.

The sales data entity 2414 includes data pertaining sales associated with competitors and, assuming the system is implemented at a company with sales, the company. For example, the sales data entity 2414 can include sales organization data tables, sales campaign data tables, sales results data tables (e.g., for the company and for competitors), or other applicable data sub-entities.

The marketing communications data entity 2416 can include, for example, marketing communication campaign data tables, competitor campaign data tables, or other applicable data sub-entities.

The financial data entity 2418 can include, for example, pricing data tables, costs data tables, or other applicable data sub-entities.

The other data entity 2420 can include just about anything else, such as, by way of example but not limitation, a suppliers data region.

Figure 25:
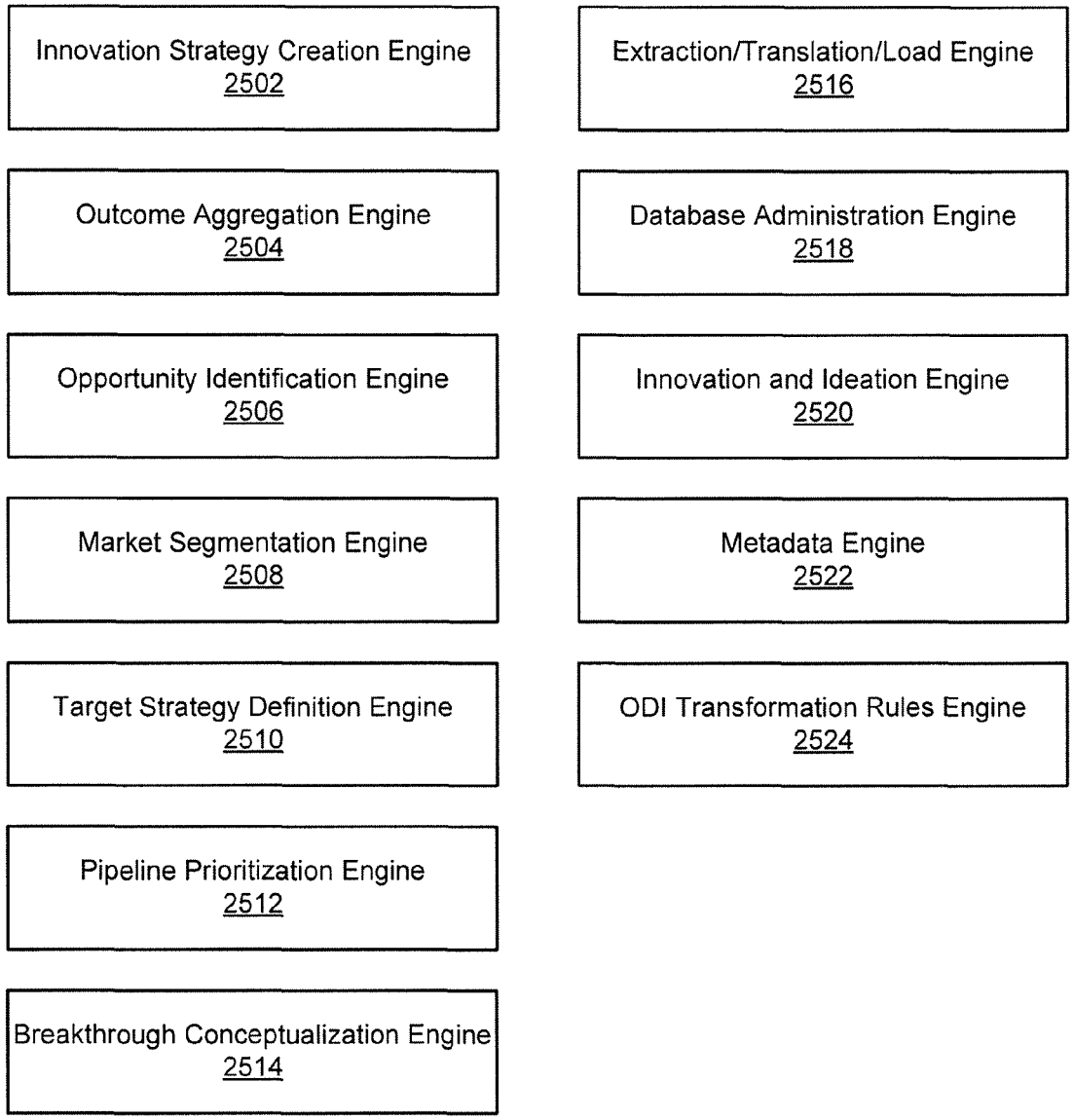
FIG. 25 depicts an example of a system.

FIG. 25 depicts an example of a system 2500. The system 2500 includes an innovation strategy creation engine 2502, an outcome aggregation engine 2504, an opportunity identification engine 2506, a market segmentation engine 2508, a target strategy definition engine 2510, a pipeline prioritization engine 2512, a breakthrough conceptualization engine 2514, an extraction/translation/load engine 2516, a database administration engine 2518, an open innovation and ideation engine 2520, a metadata engine 2522, and an ODI transformation rules engine 2524. The engines are coupled to one another in a known or convenient fashion.

Engines, as used in this paper, refer to computer-readable media coupled to a processor. The computer-readable media have data, including executable files, that the processor can use to transform the data and create new data. In the example of FIG. 24, the engines transform data and create new data using implemented data structures, such as is described with reference to FIG. 2, and implemented methods, such as are described with reference to FIGS. 3-23.

The detailed description discloses examples and techniques, but it will be appreciated by those skilled in the relevant art that modifications, permutations, and equivalents thereof are within the scope of the teachings. It is therefore intended that the following appended claims include all such modifications, permutations, and equivalents. While certain aspects of the invention are presented below in certain claim forms, the applicant contemplates the various aspects of the invention in any number of claim forms. For example, while only one aspect of the invention is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, §6 will begin with the words "means for", but use of the term "for" in any other context is not intended to invoke treatment under 35 U.S.C. §112, §6.) Accordingly, the applicant reserves the right to add additional claims after filing the application to pursue such additional claim forms for other aspects of the invention.

What is claimed is:

1. A system, comprising:
an outcome-driven innovation (ODI) data repository, embodied in a computer-readable storage medium, incorporating in each of the data records a unifying jobs framework that provides a quantifiable metric of an interaction a customer has with products or services;
a universal strategy and innovation management system (USIMS) server comprising a memory and a processor, the processor of the USIMS server configured to:
tag the each data record with one or more job identifiers to provide a numerical value associated with the each data record, the numerical value correlating the quantifiable metric of the each data record with one or more customer ODI survey responses and related meta-data;
assign the numerical value of the each data record a normalization score that has a particular market meaning independent of factors studied in the customer ODI survey responses but has a scale reflecting a significance of the quantifiable metric and the one or more job identifiers in market terms;
assign a priority of the each data record with respect to another data record of the data records, the priority based on an ODI based model of the particular market, including a measure of a job related to the particular market, and the normalization score of the each data record; and
report on a uniform dimension of importance and satisfaction based on the priority of the each data record.

2. The system of claim 1, wherein the quantifiable metric of the interaction of the each data record is the quantifiable metric of the interaction of the other data record.

3. The system of claim 1, wherein the uniform dimension of importance and satisfaction of the report comprises an indicator of one or more of:
evaluation of a market position in absolute terms relative to markets and competitors;
identification of new product opportunities and assessment of threats from changes affecting its markets;
quantification of future economic value and uncertainty of development investments and communication of information to capital markets related to asset value of a subject marketing; and
product portfolio compared to others in chosen sectors.

4. A method comprising:
creating an innovation strategy at an innovation strategy creation engine;
aggregating outcomes associated with a market, using a processor of an outcome aggregation engine;
aggregating jobs associated with the market using the processor of the outcome aggregation engine;
identifying opportunities associated with the market, the identifying the opportunities including automating calculation, ranking, and reporting of opportunity scores with associated metadata, using a processor of an opportunity identification engine;
segmenting the market, including providing tools to interact with statistical analysis and modeling packages and import additional metadata tags into a job/outcome data schema comprising a set of data entities, each of the set of data entities incorporating a unified jobs framework that provides a quantifiable metric of an interaction a customer has with products or services, the segmenting using a processor of a market segmentation engine;
defining a target strategy using a processor of a target strategy definition engine, the defining including:
tagging each of the set of data entities with one or more job identifiers to provide a numerical value associated with each data entity of a set of data entities, the numerical value correlating the quantifiable metric of customer interaction with the one or more of the opportunities;
assigning the numerical value of the each data entity a normalization score that has a particular market meaning independent of data used to gather the aggregated outcomes and the aggregated jobs, but has a scale reflecting a significance of the quantifiable metric and the one or more job identifiers in market terms;
assigning a priority of the each data entity with respect to another data entity of the data entities, the priority based on an ODI based model of the market, including a measure of one of the aggregated jobs and the normalization score of the each data entity;
providing a tool to meta-tag jobs and outcome statements in respective data entities with thematic identifiers, workflow or business process dependencies, links to other data entities declared in the system, and correlation values;
optimizing a portfolio containing the each data entity using a processor of a portfolio optimization engine; and
conceptualizing a breakthrough with the optimized portfolio using a processor of a breakthrough conceptualization engine.

5. The method of claim 4, wherein creating an innovation strategy comprises:
facilitating gathering of baseline data on strategy variables;

generating reports that facilitate a decision of prioritizing projects to pursue viable objectives in a market growth strategy; facilitating creation of an overall growth blueprint;

facilitating development of a consumption chain improvement strategy.

6. The method of claim 4, wherein aggregating outcomes comprises:

providing a generic hierarchy of jobs, job map template and information capturing and linking tools to map a job of interest and important related jobs and build a metadata library for sharing and retrieval;

providing outcome gathering common questions;

providing a shared environment for users to net outcomes down to a critical set;

providing an automated tool to index and link to or translate other market research into job and outcome statements;

providing tools to index and link media files to job and outcome statements.

7. The method of claim 4, wherein aggregating outcomes comprises:

extracting job and outcome statements directly into web survey tools;

facilitating procurement of customer lists for direct quantitative research;

providing rule-based utilities to assign survey participants to segments or groups for later analytical purposes; providing tools to deploy surveys directly to customers, screen out known survey abusers, and randomize data collection for reliability;

assessing customer response data validity through co-variance assessments on like outcomes;

automating collection of price sensitivity input during initial quantitative research;

providing tools to import survey response data directly into a data model;

providing tools to optionally distribute data with population averages back to survey participants to encourage customer engagement;

providing search tools to find other jobs and outcomes from other company or benchmark research reports and a utility for affinity tagging.

8. The method of claim 4, wherein the identifying opportunities further includes:

building and displaying opportunity landscape diagrams;

providing graphic based utilities to enhance and interact with data depicted in the landscapes;

providing graphic based utilities to enhance and modify visual representations of data within landscape diagrams.

9. The method of claim 4, wherein the segmenting the market further comprises:

providing data manipulation tools to facilitate compiling and loading of datasets into external statistical analysis packages;

providing utilities to enhance the visual representation and tabular reporting of the statistical data properties.

10. The method of claim 4, wherein defining the target strategy further comprises:

providing a tool for end users to meta-tag jobs and outcome statements in respective data entities with other thematic tags;

delivering real-time tabular and visual representations of the tagged jobs and outcomes to facilitate innovation collaboration;

providing exports of jobs and outcomes; providing a utility to scout, cull, assess the value of, and organize external sources of pre-made solutions against jobs and outcomes.

11. The method of claim 4, wherein the conceptualizing breakthroughs further comprises:

synthesizing preceding functionality to facilitate collaborative discovery of innovation breakthroughs addressing considerable unmet market needs;

isolating attractive opportunities based on the priorities of the each data entity and the other data entity;

providing tools that compare similar jobs in markets having similar outcomes, and sharing related platform enabling technology paradigms.

* * * * *